US008767936B2

(12) United States Patent  
Bingaman et al.

(10) Patent No.: US 8,767,936 B2  
(45) Date of Patent: **\*Jul. 1, 2014**

(54) DYNAMIC REPORTING TOOL FOR CONFERENCING CUSTOMERS

(75) Inventors: Anne K. Bingaman, Washington, DC (US); Dagny Boyd Evans, Alexandria, VA (US); Boban Mathew, Arlington, VA (US)

(73) Assignee: American Teleconferencing Services, Ltd., Atlanta, GA (US)

( * ) Notice: Subject to any disclaimer, the term of this patent is extended or adjusted under 35 U.S.C. 154(b) by 184 days.

This patent is subject to a terminal disclaimer.

(21) Appl. No.: 12/881,854

(22) Filed: Sep. 14, 2010

(65) Prior Publication Data

US 2011/0004619 A1   Jan. 6, 2011

Related U.S. Application Data

(63) Continuation of application No. 10/848,181, filed on May 19, 2004, now Pat. No. 7,796,744.

(60) Provisional application No. 60/471,356, filed on May 19, 2003, provisional application No. 60/546,979, filed on Feb. 24, 2004, provisional application No. 60/563,441, filed on Apr. 20, 2004.

(51) Int. Cl.  
*H04M 3/42* (2006.01)

(52) U.S. Cl.  
USPC .................................. 379/202.01; 379/204.01

(58) Field of Classification Search  
USPC .................. 379/202.01, 127, 118, 112, 121  
See application file for complete search history.

(56) References Cited

U.S. PATENT DOCUMENTS

| | | |
|---|---|---|
| 4,481,383 A | 11/1984 | Madon |
| 4,796,293 A | 1/1989 | Blinken et al. |
| 5,099,510 A | 3/1992 | Blinken, Jr. et al. |
| 5,287,270 A | 2/1994 | Hardy et al. |
| 5,483,587 A | 1/1996 | Hogan et al. |
| 5,506,893 A | 4/1996 | Buscher et al. |
| 5,631,904 A | 5/1997 | Fitser et al. |
| 5,701,340 A | 12/1997 | Zwick |
| 5,719,928 A | 2/1998 | Pinnell et al. |
| 5,818,836 A | 10/1998 | DuVal |
| 5,828,743 A | 10/1998 | Pinnell et al. |
| 5,842,174 A | 11/1998 | Yanor |
| 5,844,973 A * | 12/1998 | Venkatraman et al. .. 379/127.05 |

(Continued)

FOREIGN PATENT DOCUMENTS

WO    WO 98/23075    5/1998

OTHER PUBLICATIONS

A Professional Conference Call, http://aprocall.com/billing.aspx, printed May 21, 2003 (2 pages).

(Continued)

*Primary Examiner* — Amal Zenati  
(74) *Attorney, Agent, or Firm* — Finnegan, Henderson, Farabow, Garrett & Dunner, LLP

(57) ABSTRACT

A dynamic reporting tool presents conferencing data to customers in a useful and flexible manner. Customers may customize standard reports using dynamic, comprehensive search criteria. Customers may also create custom ad hoc reports as needed. Furthermore, customers may access unbilled usage data and conduct searches on the unbilled usage data.

10 Claims, 35 Drawing Sheets

(56) References Cited

U.S. PATENT DOCUMENTS

| | | |
|---|---|---|
| 5,867,494 A | 2/1999 | Krishnaswamy et al. |
| 5,884,284 A * | 3/1999 | Peters et al. .................... 705/30 |
| 5,903,629 A | 5/1999 | Campbell, IV et al. |
| 5,943,406 A | 8/1999 | Leta et al. |
| 5,960,069 A | 9/1999 | Felger |
| 5,960,416 A | 9/1999 | Block |
| 5,987,633 A | 11/1999 | Newman et al. |
| 6,023,499 A | 2/2000 | Mansey et al. |
| 6,049,778 A | 4/2000 | Walker et al. |
| 6,128,601 A | 10/2000 | Van Horne et al. |
| 6,134,564 A | 10/2000 | Listou |
| 6,141,404 A | 10/2000 | Westerlage et al. |
| 6,243,711 B1 | 6/2001 | Wu et al. |
| 6,377,939 B1 | 4/2002 | Young |
| 6,385,644 B1 | 5/2002 | Devine et al. |
| 6,427,008 B1 | 7/2002 | Balaz |
| 6,515,968 B1 | 2/2003 | Combar et al. |
| 6,553,108 B1 | 4/2003 | Felger |
| 6,556,659 B1 | 4/2003 | Bowman-Amuah |
| 6,574,622 B1 | 6/2003 | Miyauchi et al. |
| 6,925,160 B1 | 8/2005 | Stevens et al. |
| 7,103,644 B1 | 9/2006 | Zhang et al. |
| 7,151,824 B1 | 12/2006 | Bingaman et al. |
| 7,471,781 B2 | 12/2008 | Bingaman et al. |
| 2001/0002927 A1 | 6/2001 | Detampel, Jr. et al. |
| 2001/0012346 A1 | 8/2001 | Terry |
| 2002/0025028 A1 | 2/2002 | Manto |
| 2002/0026394 A1 | 2/2002 | Savage et al. |
| 2002/0138828 A1 | 9/2002 | Robohm et al. |
| 2002/0161667 A1 | 10/2002 | Felkey et al. |
| 2003/0023523 A1 | 1/2003 | McKibben et al. |
| 2003/0023582 A1 | 1/2003 | Bates et al. |
| 2003/0072428 A1 | 4/2003 | Stern et al. |
| 2004/0073500 A1 | 4/2004 | Owen, Jr. |
| 2004/0170260 A1 | 9/2004 | Baker |
| 2007/0124258 A1 | 5/2007 | Bingaman et al. |
| 2009/0129572 A1 | 5/2009 | Bingaman et al. |

OTHER PUBLICATIONS

CustomCall Data Systems, http://www.customcall.com/index.html, printed May 21, 2003 (1 page).

* cited by examiner

DYNAMIC REPORTING TOOL FOR CONFERENCING CUSTOMERS

I. RELATED APPLICATIONS

This application is a continuation of application Ser. No. 10/848,181, filed May 19, 2004 now U.S. Pat. No. 7,796,744, which is incorporated by reference in its entirety. This application also claims the benefit of priority of the following U.S. Provisional Patent Applications, all of which are incorporated herein by reference:

U.S. Provisional Patent Application No. 60/471,356, entitled INTERFACE TO BILLING SYSTEMS FOR CLIENT-REIMBURSABLE OR PROJECT ASSIGNABLE AUDIO-CONFERENCE CALL CHARGES, filed May 19, 2003;

U.S. Provisional Patent Application No. 60/546,979, entitled ONLINE REPORTING TOOL, filed Feb. 24, 2004; and U.S. Provisional Patent Application No. 60/563,441, entitled BILLING SYSTEM AND METHOD FOR CONFERENCING SERVICES, filed Apr. 20, 2004.

II. BACKGROUND

A. Technical Field

The present invention relates generally to billing systems for conferencing services and more particularly to billing systems for conferencing services that are chargeable to a client or project.

B. Introduction

Businesses today rely heavily on conferencing services to enable people to meet without having to be physically present in the same location. Audio conferencing, video conferencing, and Web conferencing are all well-known services available to businesses operating on a regional, national, or global scale. Typically, a business makes a reservation for a conference through a conferencing services provider (CSP). The CSP establishes a "virtual location," e.g., a dial-in phone number or a Website address, for the conference participants. After the conference is over, the CSP bills the business for the cost of the conference.

A traditional CSP utilizes one or more conference facilities that provide the hardware, e.g., telephone bridges or Web servers, to support conferences. The CSP may use standard scheduling software to process customer reservations and employ a customer help line to handle any problems. If the CSP uses commissioned salespeople to sell its services, it may also use a separate sales system to track its sales and commissions data. The CSP may use an off-the-shelf or internally-developed billing system to track customer accounts and produce bills for conferences.

Many conferencing customers bill conferencing charges to their own clients or divide conferencing charges over multiple projects. For example, a law firm or consulting firm may work for several different clients and wish to divide its conferencing charges among the appropriate clients and/or matters. Because a conventional CSP typically provides a customer with a paper bill or an electronic bill in a standard format for all of its customers, the customer must input or manipulate the billing data before using the customer's own client billing software. Thus, someone in the customer's financial services department must manually process each conference bill to enable the customer to pass conferencing charges on to its clients or divide a bill among several projects. For a customer with hundreds of clients or projects, this not only takes a great deal of time but can result in human mistakes billing one client or project for another's conferences, resulting in client-relation problems.

Furthermore, conventional CSPs rely on a patchwork of systems and software that must be modified to meet the specific demands of conferencing services. For example, conferences involve a number of different people, each requiring different levels of access and information. In addition to the participants in a conference, a company's secretarial staff may be involved in scheduling the conference. The company's financial staff may be involved in processing bills, and an administrator may be designated to oversee the company's contract with the CSP. Depending on individual needs and responsibilities, each person may need access to different information. This can be very difficult to manage for a conventional conferencing services provider that relies on several separate systems.

Another difficulty faced by conventional CSPs is the calculation of salesperson commissions. Traditional commission systems base a salesperson's commission on a single measure that is easily calculated. Examples of such measures include total amount of sales or number of items sold, over a time period. Such systems are generally not designed to calculate commissions based on more economically meaningful measures such as gross margin (i.e., revenues minus cost of services sold) because of the complexity of calculating such measures. Sources of complexity include: different rates charged to different customers; different costs of services in different periods of time; and different commission rates for different services. However, conferencing services cannot be measured in simple amounts. Instead, conferencing rates vary a great deal based on, e.g., number of minutes, number of participants, time of day, etc. Furthermore, in one time period, a single customer may use several different services, making it difficult to quantify exactly what a salesperson has sold.

Systems and methods consistent with embodiments of the present invention address these and other drawbacks of conventional conferencing services provider systems.

III. SUMMARY OF THE INVENTION

Additional aspects of the invention will be set forth in part in the description which follows, and in part will be obvious from the description, or may be learned by practice of the invention.

Systems consistent with the present invention include a dynamic reporting tool to present conferencing data to customers in a useful and flexible manner. Customers may customize standard reports using dynamic, comprehensive search criteria. Customers may also create custom ad hoc reports as needed. Furthermore, customers may access unbilled usage data and conduct searches on the unbilled usage data.

In one embodiment of the present invention, a method for reporting data related to conferencing services to customers comprises receiving a request from a customer for data related to a conference conducted by participants associated with a customer and receiving, from the customer, a primary search criteria selected from among a set of data fields in the data related to the conference. A possible secondary search criteria is presented based on the primary search criteria selected and the remaining data fields in the set of data fields and a selected secondary search criteria is received from the customer. Finally, a report containing data related to the conference meeting the primary search criteria and the secondary search criteria is delivered to the customer.

In another embodiment, a method for reporting unbilled charges related to conferencing services to customers comprises receiving a request from a customer for data related to unbilled charges for conferences conducted by participants associated with a customer and presenting a list of data fields available within unbilled charge data corresponding to the customer. When a search criteria is selected from among the list of data fields by the customer, the unbilled charge data corresponding to the customer is searched for unbilled charge data meeting the search criteria, and the unbilled charge data meeting the search criteria is delivered to the customer.

In yet another embodiment, a method for reporting data related to charges for conferencing services to customers comprises receiving a request for a report of charges related to conferences conducted by participants associated with a customer and displaying a list of data fields available within charges related to conferences conducted by participants associated with a customer. From the customer are received a selection of at least one of the listed data fields, a display order of the selected data fields, and a sort order for data in the selected data fields. A report is generated including data in the selected data fields displayed in the display order and sorted in the sort order.

It is to be understood that both the foregoing general description and the following detailed description are exemplary and explanatory only and are not restrictive of the invention, as claimed.

IV. BRIEF DESCRIPTION OF THE DRAWINGS

The accompanying drawings, which are incorporated in and constitute a part of this specification, illustrate several embodiments of the invention and together with the description, serve to explain the principles of the invention.

In the drawings:

FIG. 7A is a screen shot of a sample account information screen, consistent with an embodiment of the present invention;

FIG. 7B is a screen shot of a sample billing information screen, consistent with an embodiment of the present invention;

FIG. 7D is a screen shot of a sample customer traits screen, consistent with an embodiment of the present invention;

V. DETAILED DESCRIPTION

A. Environment

Figure 1:
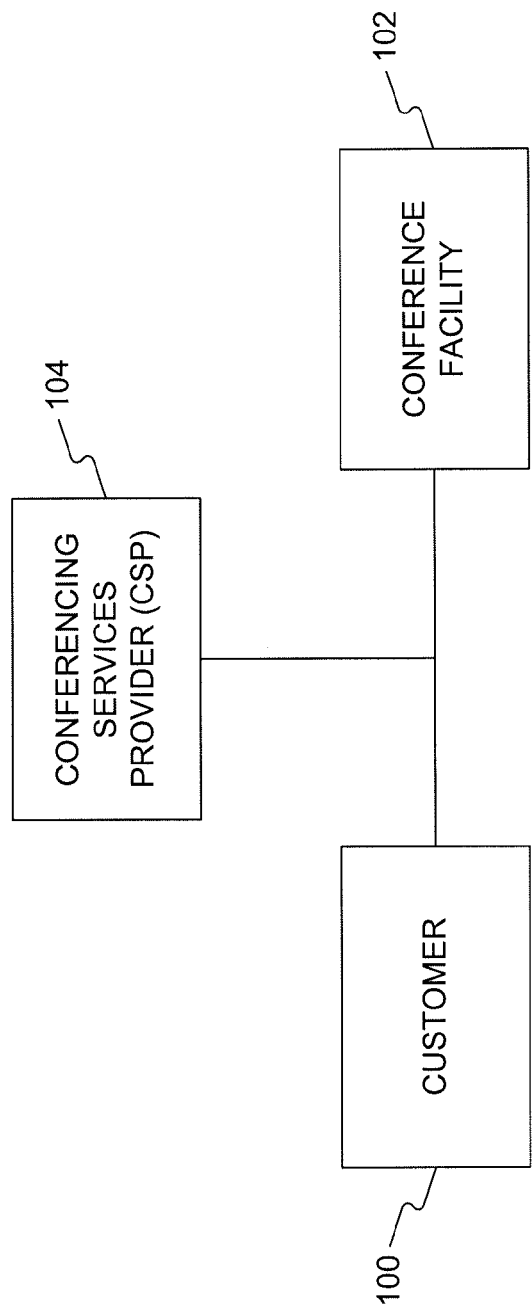
FIG. 1 is a block diagram of a system for providing conferencing services, consistent with an embodiment of the present invention.

FIG. 1 is a block diagram of a system for providing conferencing services consistent with an embodiment of the present invention. The system of FIG. 1 includes a customer 100, a conference facility 102, and a conferencing services provider (CSP) 104. Systems consistent with the present invention may include any number of customers 100, conference facilities 102, and CSPs 104. To provide conferencing services to customer 100, CSP 104 may utilize one or more conference facilities 102 to facilitate conferences for participants associated with customer 100.

A conference may include any type of meeting in which the participants are not physically in the same place, such as an audio conference, video conference, Web conference, or other type of conference. In one embodiment, some of the participants may be gathered together in one physical location while others are geographically dispersed. In another embodiment, each participant may be separated from the others. One of the participants may be designated as the moderator and may, for example, schedule the conference and input client billing information at the beginning of the conference.

A single customer 100 may have many associated moderators. For example, in a customer company, many different employees may conduct conferences and each one may function as a moderator at some time. In one embodiment, when customer 100 establishes an account with CSP 104, it may specify moderators associated with its account. Alternatively, a customer 100 with an existing account may add moderators at any time. CSP 104 may train moderators in using its conferencing services and may track information about each moderator, such as whether a moderator has been trained or how many conferences a moderator has conducted. CSP 104 may offer incentives or rewards to moderators, such as prizes for the moderator with the most conferences or a special offer for a moderator that has not conducted a conference in a long time.

Conference facility 102 provides a virtual location for a conference and collects data about the conference. For example, if the conference is an audio conference, conference facility 102 may include an audio conference bridge and may generate call detail records (CDRs) containing details about the conference, such as the number of participants, location of participants, and the amount of time each participant was connected to the conference. Consistent with an embodiment of the present invention, conference facility 102 also collects client billing information for the conference, e.g., from a moderator.

Client billing information may be any information used by customer 100 to allocate conferencing charges. For example, client billing information may include a client code identifying the customer's client that will be charged for part or all of a conference. In another example, client billing information may include a project code identifying the project that should be charged for part or all of a conference. In still another example, client billing information may include a biller code (e.g., an employee number) identifying the moderator or other conference participants. Consistent with the present invention, the client billing information may be associated with third parties (e.g., law firm clients) or with customer 100 (e.g., different projects or departments within the customer).

Figure 2:
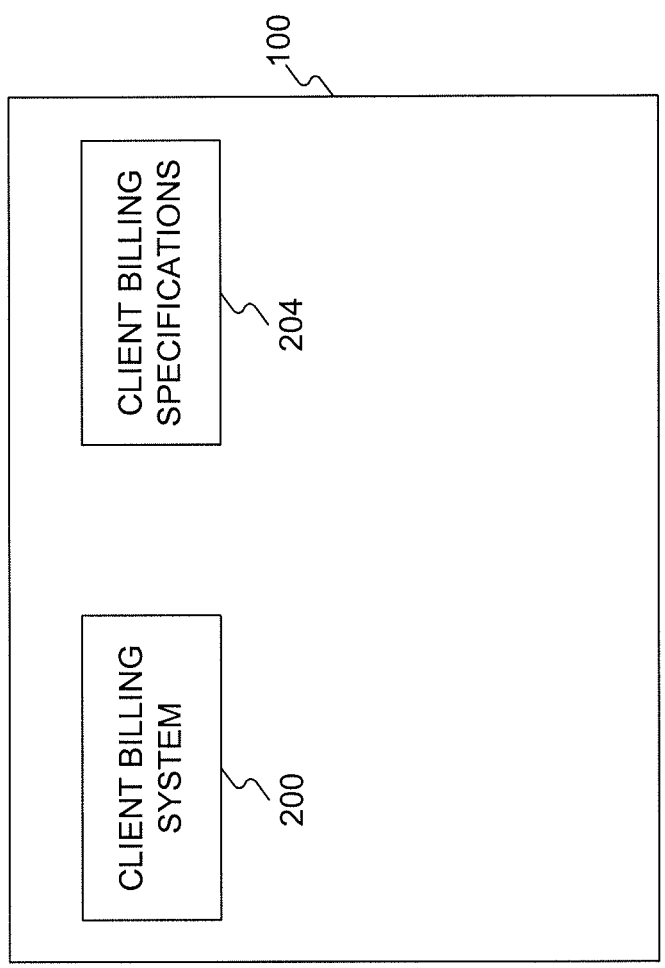
FIG. 2 is a block diagram of a customer in greater detail, consistent with an embodiment of the present invention.

FIG. 2 is a block diagram of customer 100 in greater detail, consistent with an embodiment of the present invention. As shown in FIG. 2, customer 100 includes client billing system 200 and client billing specifications 204. Client billing system 200 may be any system that enables customer 100 to pass charges on to its clients. Alternatively, client billing system 200 may enable customer 100 to divide charges over a plurality of projects, project codes, tasks, etc. Client billing system 200 may use, for example, client codes, matter codes, biller codes, and other data in dividing charges over clients and/or projects. For example, a law firm representing many clients may assign a unique client number to each of its clients and a unique matter number to each matter for each client. Law firm customers may use known law firm billing system such as Elite, CMS-Open, etc. Client billing system 200 may be part of customer 100 or may be provided by a third party, including CSP 104.

Client billing specifications 204 may be associated with customer 100 and may correspond to client billing system 200. For example, client billing specifications 204 may specify that data input to client billing system 200 contain certain data fields in a certain order and that the data be in a specific format. For example, client billing specifications 204 may dictate two separate fields containing a client code and a matter code. In one embodiment, client billing specifications 204 may be standardized based on the type of billing system used by customer 100 or a default billing system. Client billing system 200 and client billing system specifications 204 are described in greater detail below with reference to FIGS. 17-19.

Figure 3:
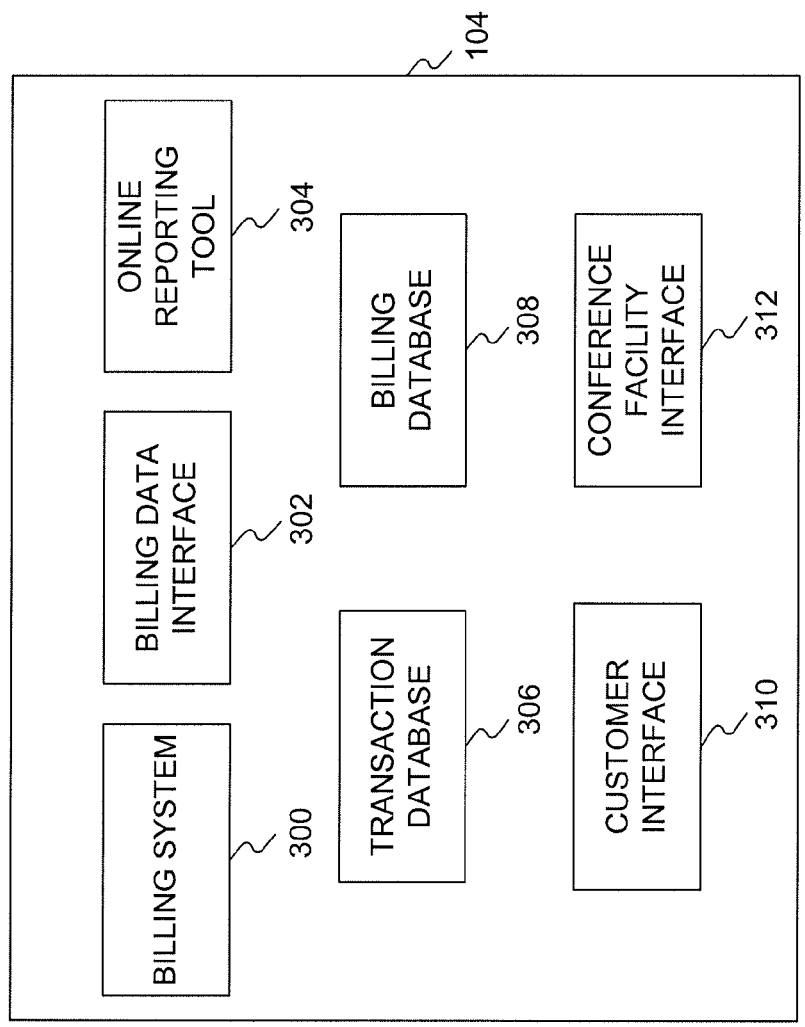
FIG. 3 is a block diagram of a conferencing services provider in greater detail, consistent with an embodiment of the present invention.

FIG. 3 is a block diagram of CSP 104 in greater detail, consistent with an embodiment of the present invention. CSP 104 may include a billing system 300 to generate and manage conferencing charges for customers using conferencing services, a billing data interface 302 to provide billing data to customers in an accurate and efficient manner, and an online reporting tool 304 to present conferencing data to customers in a useful and flexible manner. CSP 104 may also include a transaction database 306, a billing database 308, a customer interface 310, and a conference facility interface 312.

Data to support CSP 104 may be stored, for example, in transaction database 306 and/or billing database 308. Alternatively, fewer or more than two databases may be used by CSP 104. CSP 104 may communicate with customers 100 via customer interface 310. For example, customer interface 310 may include a graphical user interface presented via a web server to customers over a network such as the Internet. Conference facility interface 312 enables CSP 104 to interface with conference facilities 102. For example, CSP 104 may use conference facility interface 312 to download information from conference facility 102. One skilled in the art will appreciate that CSP 104 may include fewer or more components than those depicted in FIG. 3. Furthermore, the components of CSP 104 may be combined or separated differently from the configuration shown in FIG. 3, and the components may be implemented in software and/or hardware.

Figure 4:
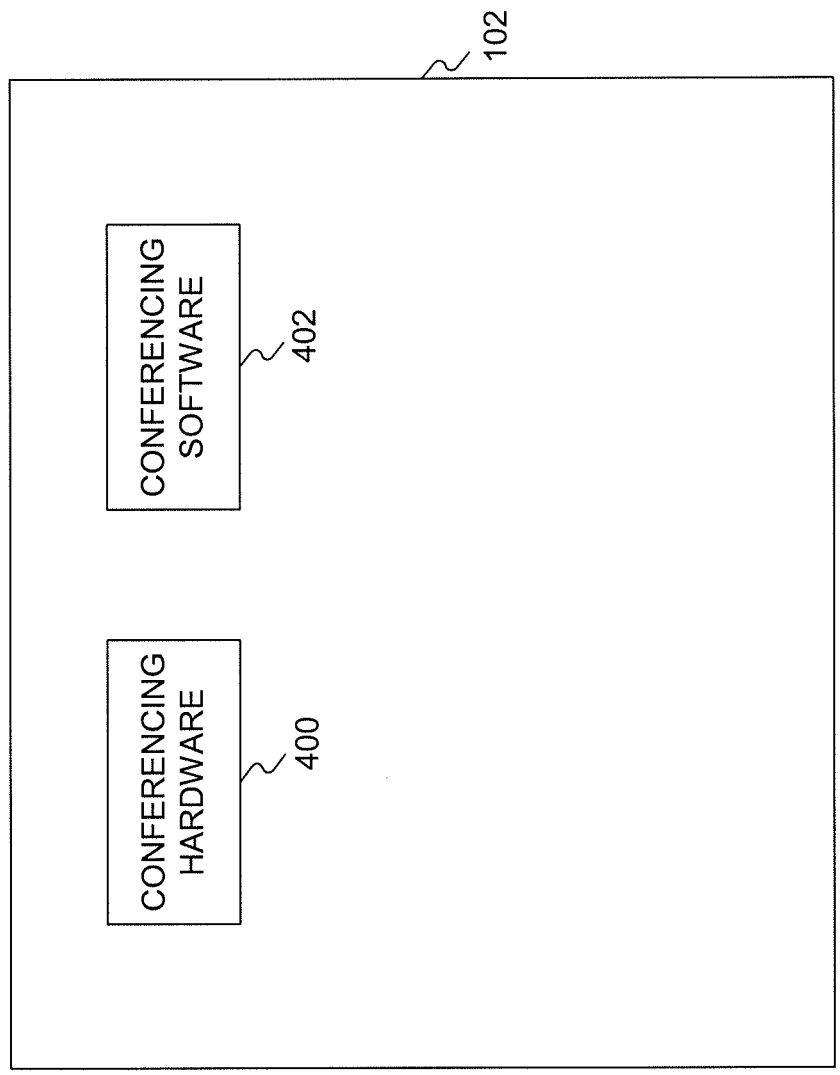
FIG. 4 is a block diagram of a conference facility in greater detail, consistent with an embodiment of the present invention.

FIG. 4 is a block diagram of conference facility 102 in greater detail, consistent with an embodiment of the present invention. Conference facility 102 may be any provider of hardware and/or software for conferencing. Conference facility 102 may include, for example, conferencing hardware 400 and conferencing software 402. For example, for an audio conference system, conferencing hardware 400 may include an audio conference bridge, and conferencing software 402 may include software to collect and transmit call data records (CDRs). In another alternative, conference facility 102 may offer web conferencing using conferencing hardware 400 including a web server and conferencing software 402 to manage the web server and interact with CSPs and customers.

B. Billing System

Systems consistent with the present invention include a CSP billing system to generate and manage conferencing charges for customers using conferencing services. Such a billing system may integrate functions such as customer care, management reporting, billing, commission management, and payment processing to provide seamless service to conferencing customers.

Figure 5:
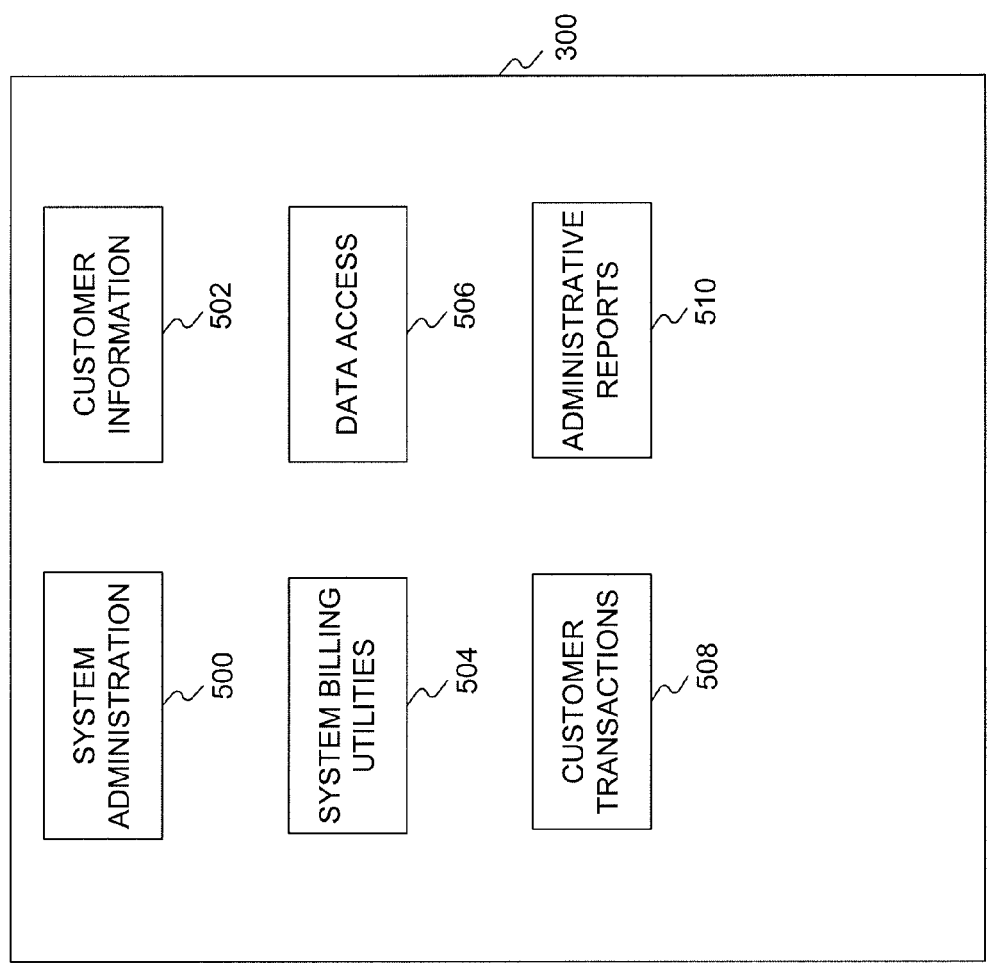
FIG. 5 depicts a CSP billing system in greater detail, consistent with an embodiment of the present invention.

FIG. 5 depicts CSP billing system 300 in greater detail, consistent with an embodiment of the present invention. Billing system 300 includes a plurality of components, such as system administration 500, customer information 502, system billing utilities 504, data access 506, customer transactions 508, and administrative reports 510, each described in greater detail below. CSP 104 may use the components of billing system 300 to provide conferencing services to customers 100. In one embodiment, each of the components of billing system 300 may be presented as a tab on a graphical user interface to users of billing system 300. One skilled in the art will appreciate that the components depicted as being part of billing system 300 may be accessed from other parts of CSP 104 (e.g., from billing data interface 302). Furthermore, billing system 300 may include fewer or more components than are depicted in FIG. 5, the components may be combined or separated in different ways, and the components may be implemented in hardware and/or software.

Figure 6:
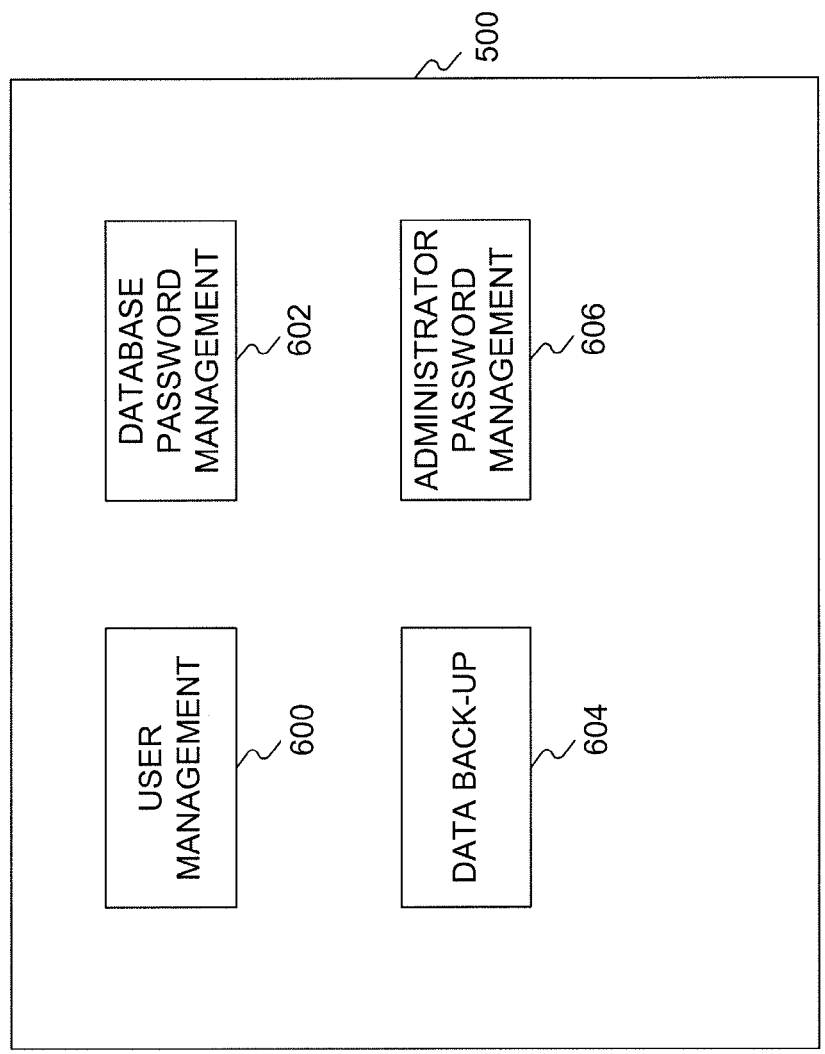
FIG. 6 is a block diagram of system administration in greater detail, consistent with an embodiment of the present invention.

FIG. 6 is a block diagram of system administration 500 in greater detail, consistent with an embodiment of the present invention. System administration 500 includes tools that may be used by a user such as an administrator to manage billing system 300. In one embodiment, system administration 500 includes user management 600, database password management 602, data backup 604, and administrator password management 606. The components of system administration 500 may be presented to the administrator, for example, as entries in a drop-down list accessed via a system billing and payment tab on a graphical user interface. By selecting user management 600, the administrator may manage users of billing system 300.

Figure 6A:
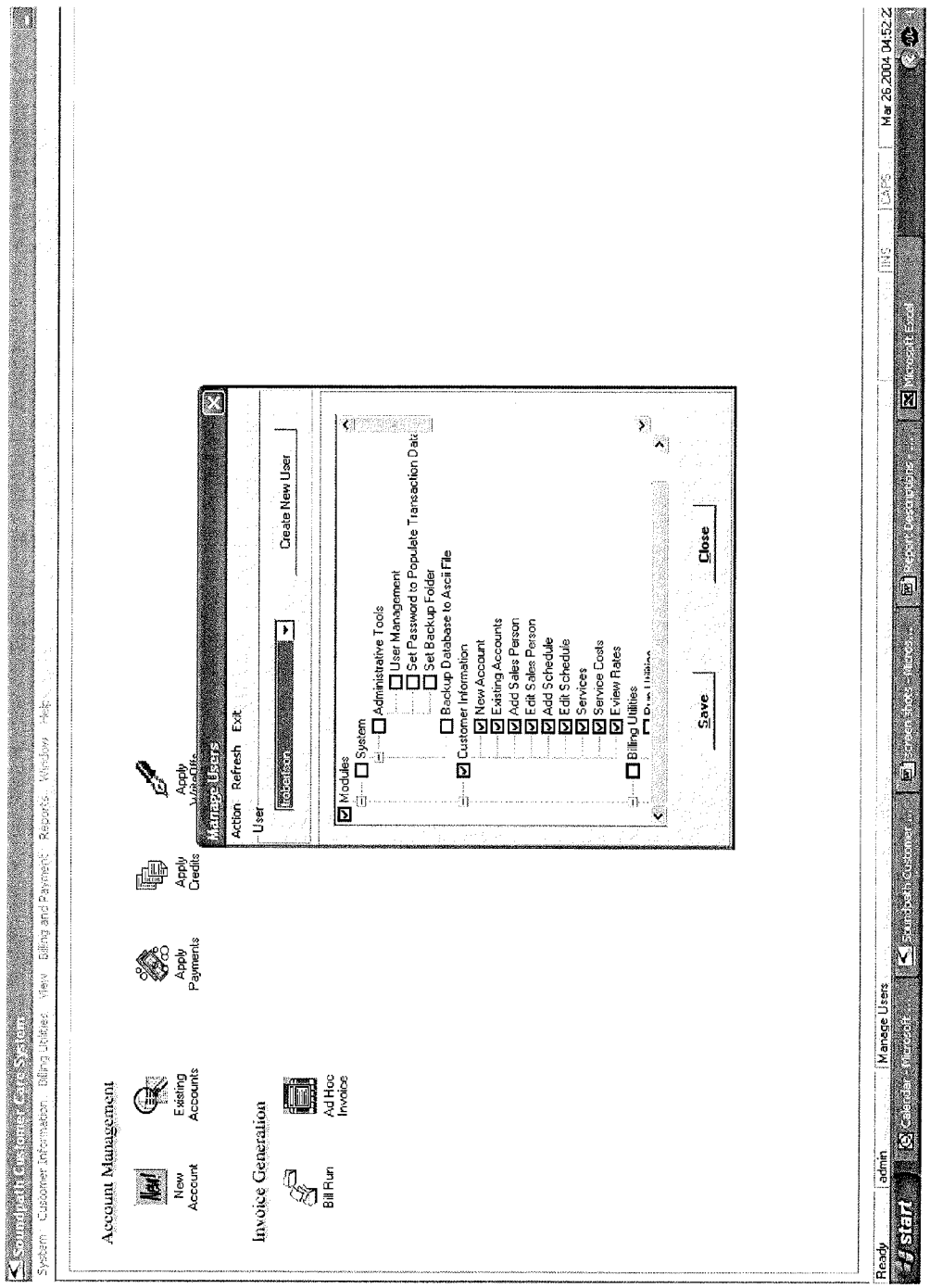
FIG. 6A is a screen shot of a sample display for managing users, consistent with an embodiment of the present invention.

FIG. 6A is a screen shot of a sample display for managing users, consistent with an embodiment of the present invention. Via user management 600, the administrator is presented with a dialog box. The administrator may select a user, e.g., from a drop-down list of users, to manage. The administrator may also choose to create a new user and be prompted to provide user information such as a user name, user type, and user password.

To manage a user, the administrator may specify a great deal of detail about the user's access rights. For example, the administrator may select each component of billing system 300 (e.g., customer information 502 or data access 506) that the user may access. The administrator may also grant the user access to individual parts of each component. For example, the administrator may only grant the user access to add or edit sales people but not to any other part of customer information 502. Alternatively, the administrator may grant different types of access to the user, such as the right to view some reports and the right to edit other reports. In one embodiment, the user may not even be aware of components to which the user does not have access. For example, if the user does not have access to anything in system administration 500, the system administration tab will not be visible to the user when the user logs on to billing system 300.

The administrator may use database password management 602 to edit a password used to access part of billing system 300. For example, transaction database 306 may be password-protected, and the administrator may edit the password via database password management. The administrator may use data back-up 604 to manage the backup of data for billing system 300. For example, the administrator may specify a database, e.g., transaction database 306, to be backed up and a location where the back-up will be stored. The administrator may also specify what data is to be backed up, such as certain fields, types of files, etc. Using administrator password management 606, the administrator may change the password for the administrator to access billing system 300.

One skilled in the art will appreciate that the components depicted as being part of system administration 500 may be accessed from other parts of billing system 300 (e.g., from administrative reports 510). Furthermore, system administration 500 may include fewer or more components than are depicted in FIG. 6, the components may be combined or separated in different ways, and the components may be implemented in software and/or hardware.

Figure 7:
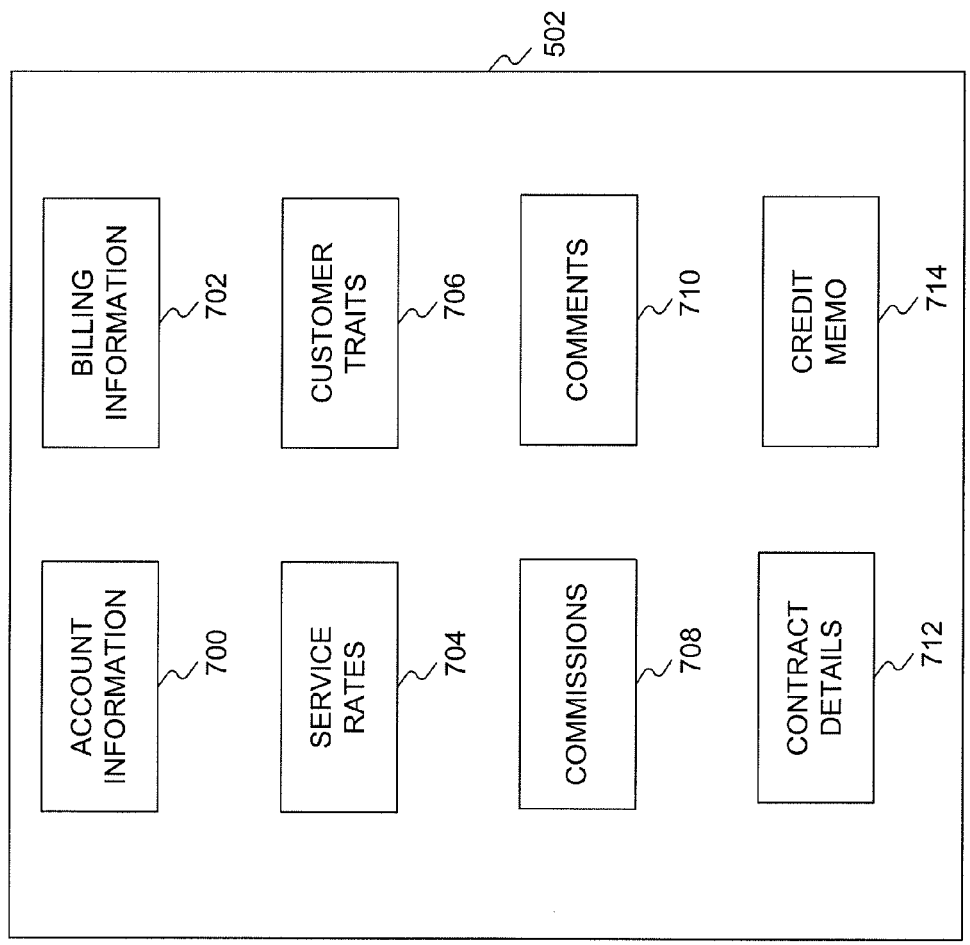
FIG. 7 is a block diagram of customer information in greater detail, consistent with an embodiment of the present invention.

FIG. 7 is a block diagram of customer information 502 in greater detail, consistent with an embodiment of the present invention. Customer information 502 may include tools used by billing system 300 to manage information relating to customers 100 in order to provide conferencing services. Customer information 502 comprises components such as account information 700, billing information 702, service rates 704, customer traits 706, commissions 708, comments 710, contract details 712, and credit memo 714. The components of customer information 502 may be listed, for example, as entries in a drop-down list accessed via a system billing and payment tab on a graphical user interface, may be presented to a user or administrator as dialog boxes, and may be implemented in hardware and/or software.

Figure 7A:
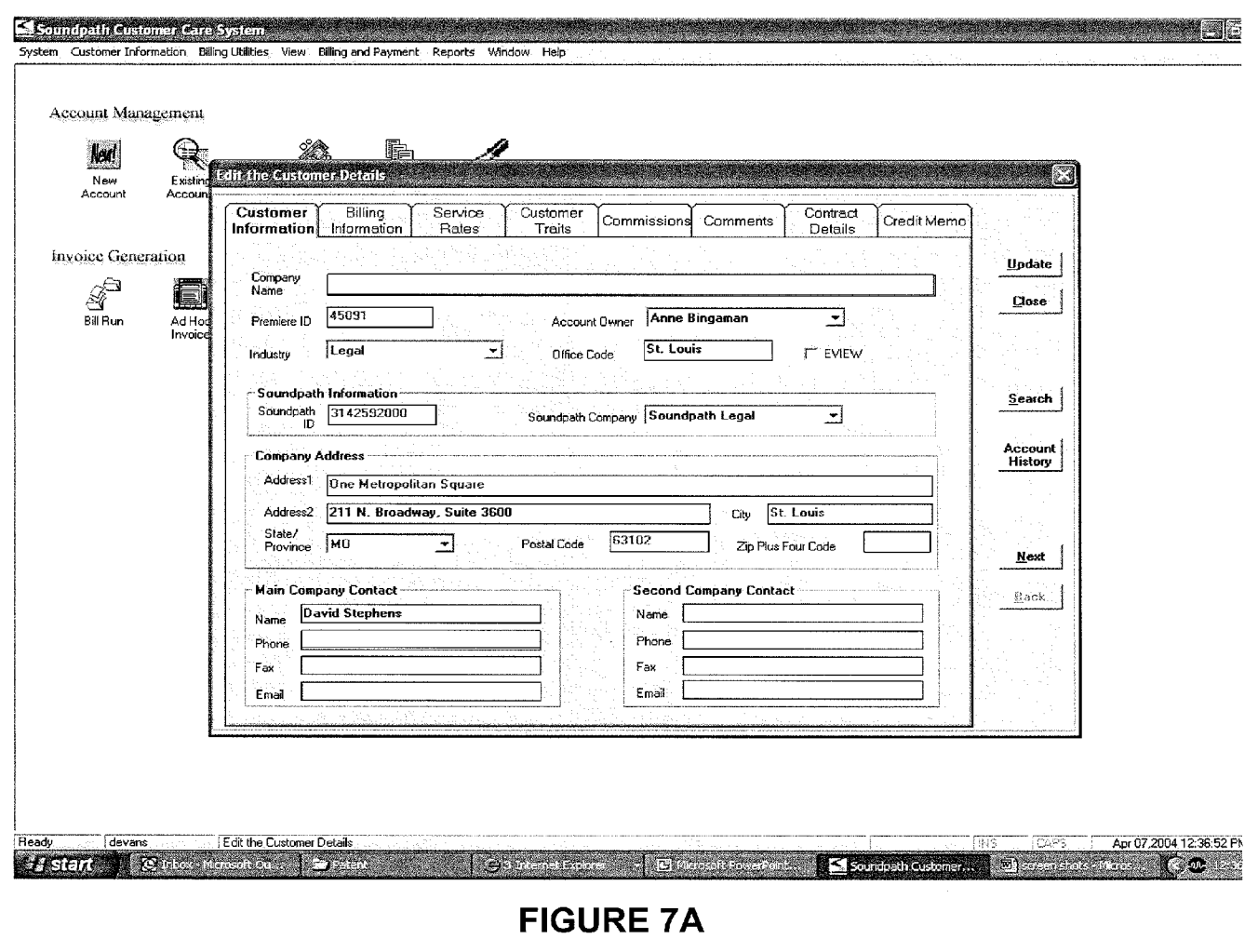

FIG. 7A is a screen shot of a sample account information screen consistent with an embodiment of the present invention. Account information 700 maintained by billing system 300 may include information about customers 100 such as, for example, company name, company ID, account owner, industry, office code, CSP ID, CSP company, company address, and company contact information. A single company may have multiple office codes corresponding, for example, to different locations or departments. An authorized user may view, update, search, print, etc., account information 700. The user may also view the account history corresponding to account information 700.

Figure 7B:
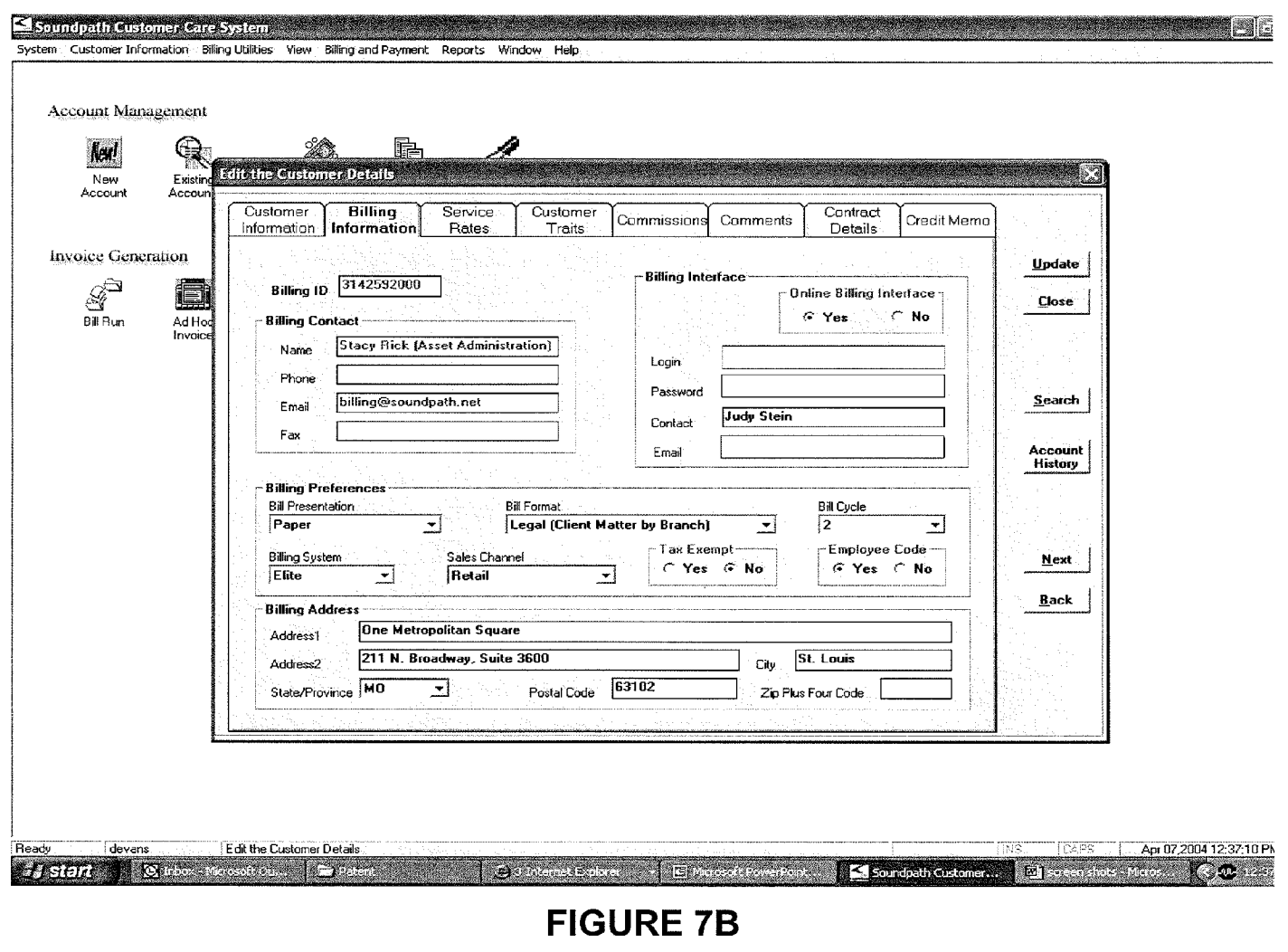

FIG. 7B is a screen shot of a sample billing information screen, consistent with an embodiment of the present invention. Billing information 702 maintained by billing system 300 may include, for example, a billing ID, billing contact, billing interface data, billing preferences, and a billing address. The billing contact for a customer may be the same as or different from the company contacts. Billing interface data may include data about how the customer receives billing data, such as whether the client receives billing data online, a login, a password, a contact name, and contact information. The customer's billing preferences may include, for example, type of bill presentation, bill format, bill cycle, customer client billing system, sales channel, tax status, and whether the customer uses biller codes. Customer billing is described in greater detail below with reference to FIGS. 17-20.

Figure 7C:
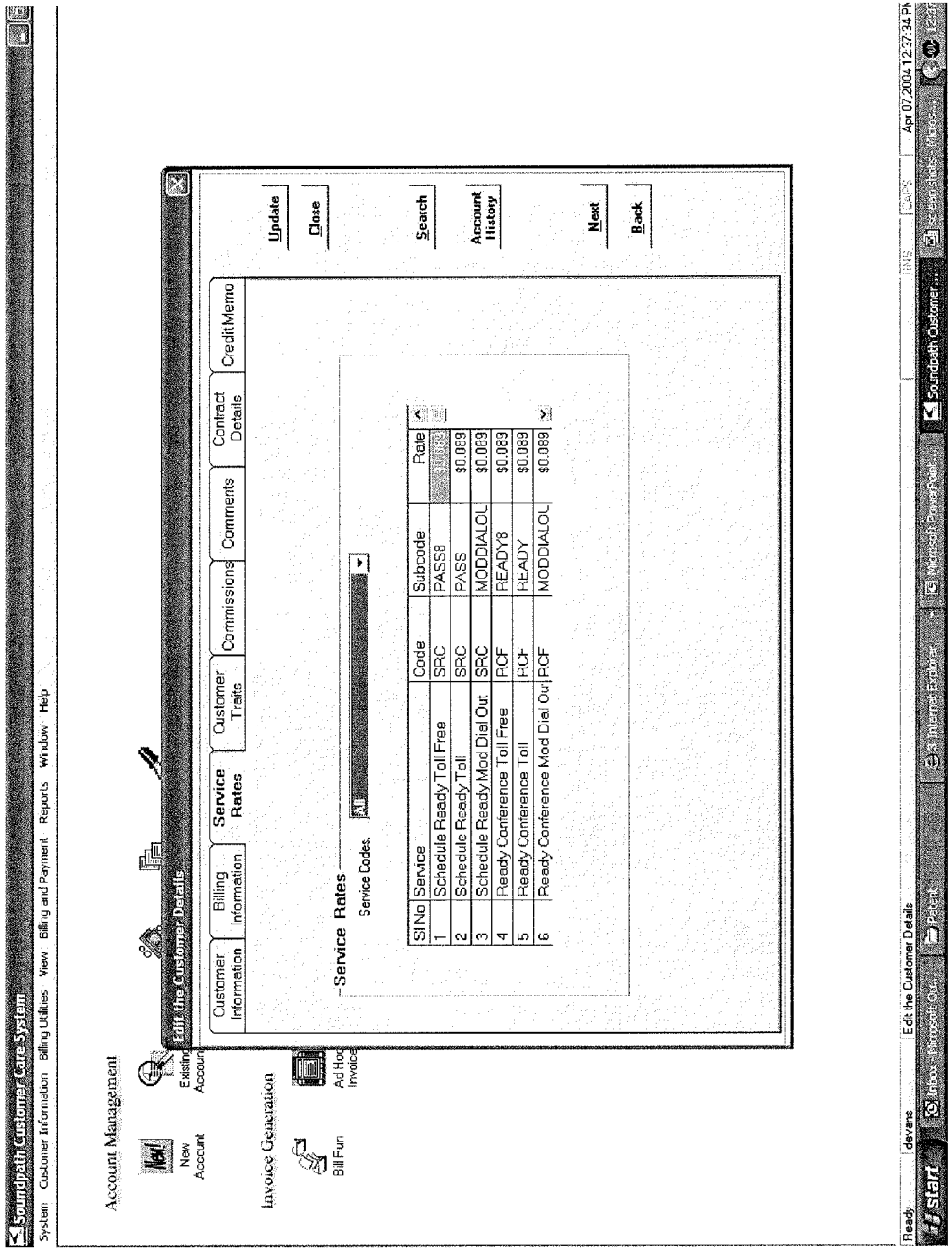
FIG. 7C is a screen shot of a sample service rates screen, consistent with an embodiment of the present invention.

FIG. 7C is a screen shot of a sample service rates screen, consistent with an embodiment of the present invention. Service rates 704 tracked by billing system 300 include the rates paid for conferencing services, which may vary from customer to customer. Furthermore, a single customer may pay many different rates. For example, a customer may pay a different rate for each type of service (e.g., reservationless conference or operator-assisted conference, toll free or toll, etc.). Each rate may be tracked using a service name, service code, service sub-code, and rate. The costs associated with each customer and/or service are also managed by billing system 300.

Figure 7D:
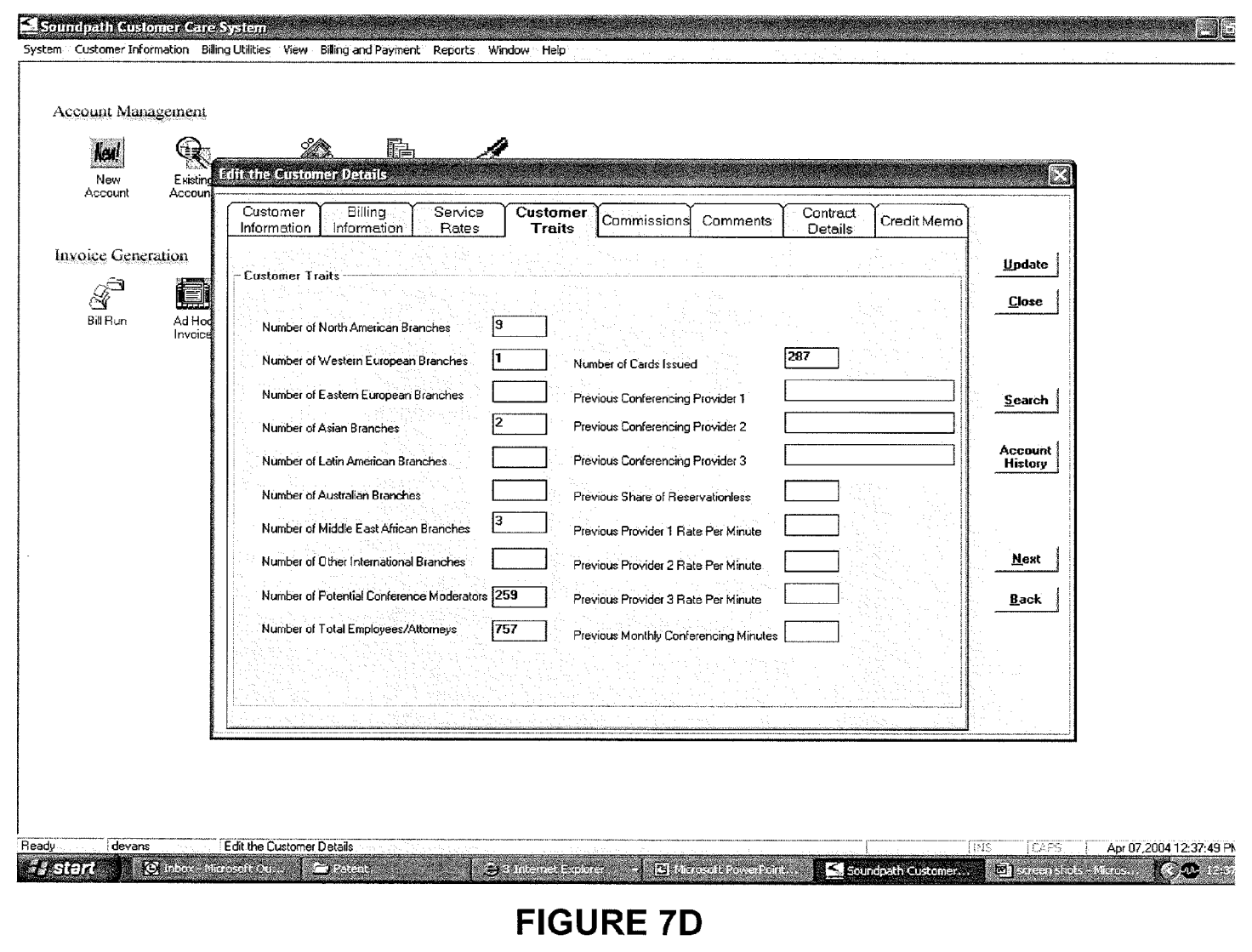

FIG. 7D is a screen shot of a sample customer traits screen, consistent with an embodiment of the present invention. Billing system 300 may manage customer traits 706 to provide additional detail about customers 100. For example, customer traits may include number of branches, number of moderators, number of employees, previous CSP, previous rates, etc.

Figure 7E:
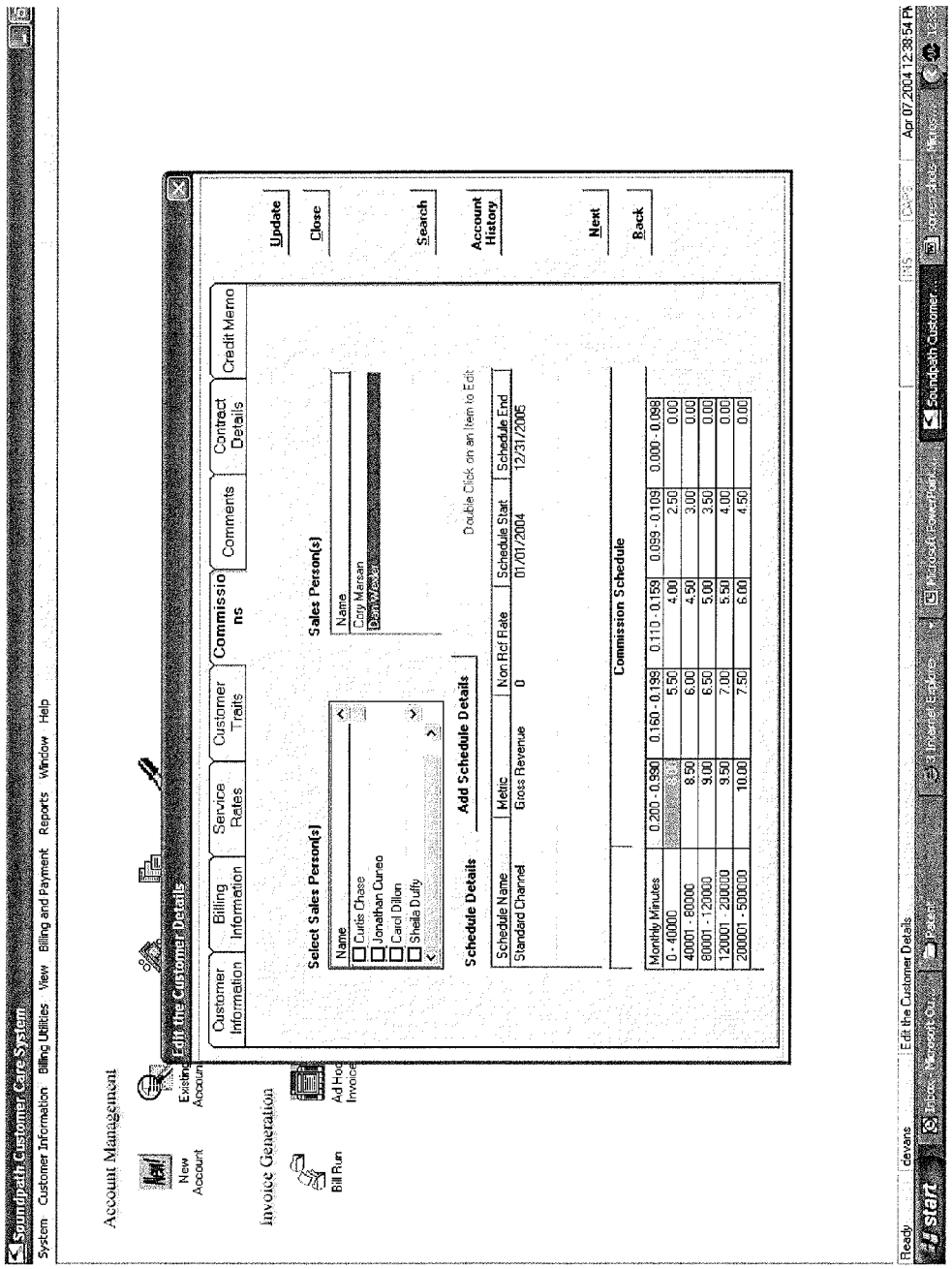
FIG. 7E is a screen shot of a sample commission screen, consistent with an embodiment of the present invention.

FIG. 7E is a screen shot of a sample commission screen consistent with an embodiment of the present invention. Commissions 708 may be used by billing system 300 to manage commissions for salespeople: Consistent with the present invention, a salesperson may be compensated for selling conferencing services for CSP 104. The salesperson may be compensated based on a commission schedule created and managed using commissions 708. For example, each salesperson may have a unique commission schedule for each customer he sells to, or the salesperson may have a default commission schedule. Alternatively, all of the salespeople for a customer may have a standard commission schedule.

To manage commissions, a commission schedule may be used. For each salesperson, an administrator or user may enter schedule details, such as the schedule name, metric, rate, schedule start date, and schedule end date. The schedule name may refer to a default commission schedule, a schedule corresponding to a customer, a schedule corresponding to a salesperson, etc. The metric may specify that the commission rate is based on gross revenue, gross margin, highest revenue, revenue collected, etc.

A matrix may be used to represent the commission schedule, such as the matrix shown in FIG. 7E. Using the matrix, a salesperson's commission may be based on the number of minutes used by a customer, the rate paid by the customer, and the commission rate. In this way, commissions may be customized according to the unique aspects of selling conferencing services.

Figure 7F:
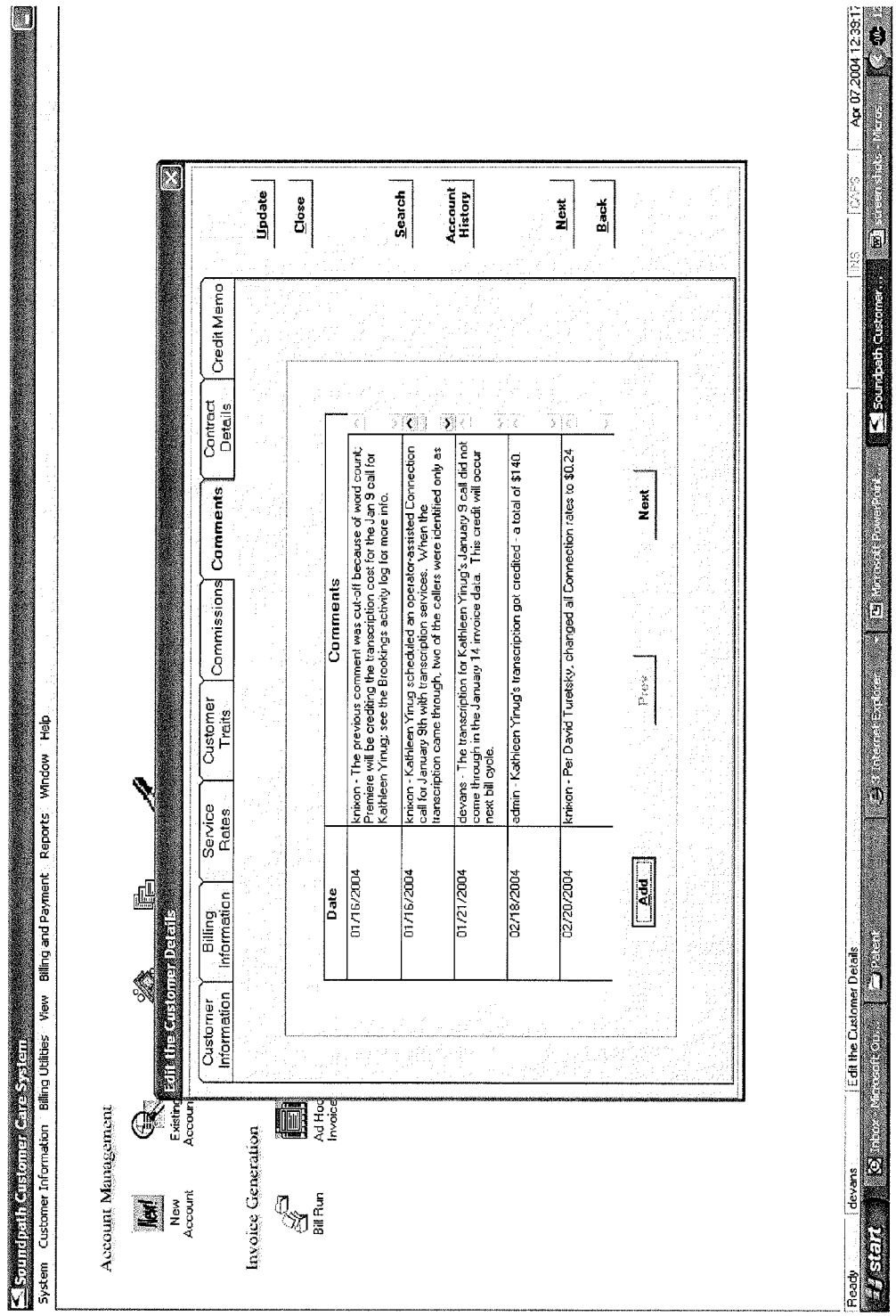
FIG. 7F is a screen shot of a sample customer comments screen, consistent with an embodiment of the present invention.

FIG. 7F is a screen shot of a sample customer comments screen consistent with an embodiment of the present invention. Customer comments 710 may include, for example, a comment date and a comment. The comment may include notes from an administrator or user regarding a customer 100, such as information about the customer's account or services.

Figure 7G:
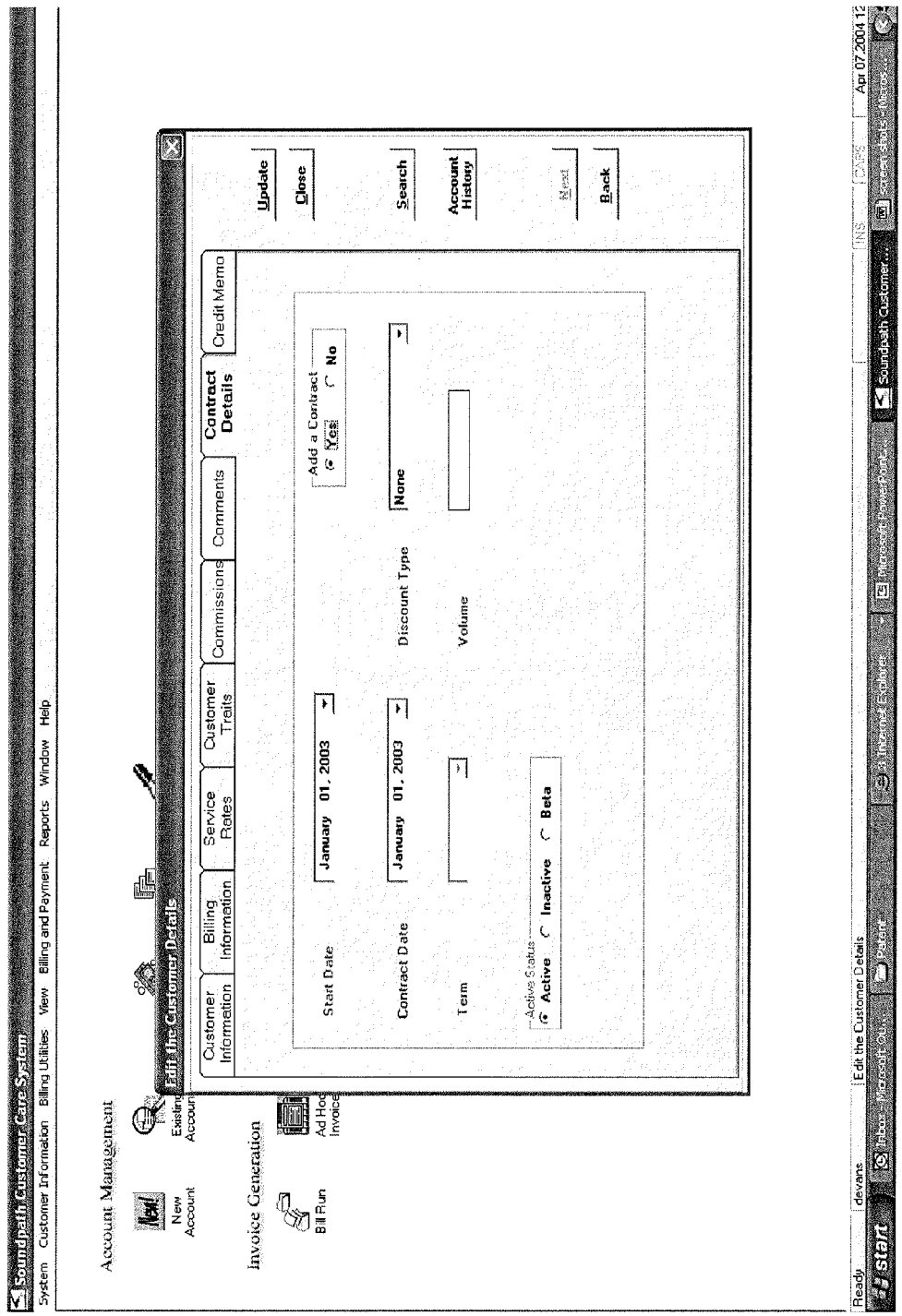
FIG. 7G is a screen shot of a sample contract details screen, consistent with an embodiment of the present invention.

FIG. 7G is a screen shot of a sample contract details screen, consistent with an embodiment of the present invention. Contract details 712 may include details about a contract between CSP 104 and a customer 100, such as contract start date, contract end date, discount type, term, volume, and status.

Figure 7H:
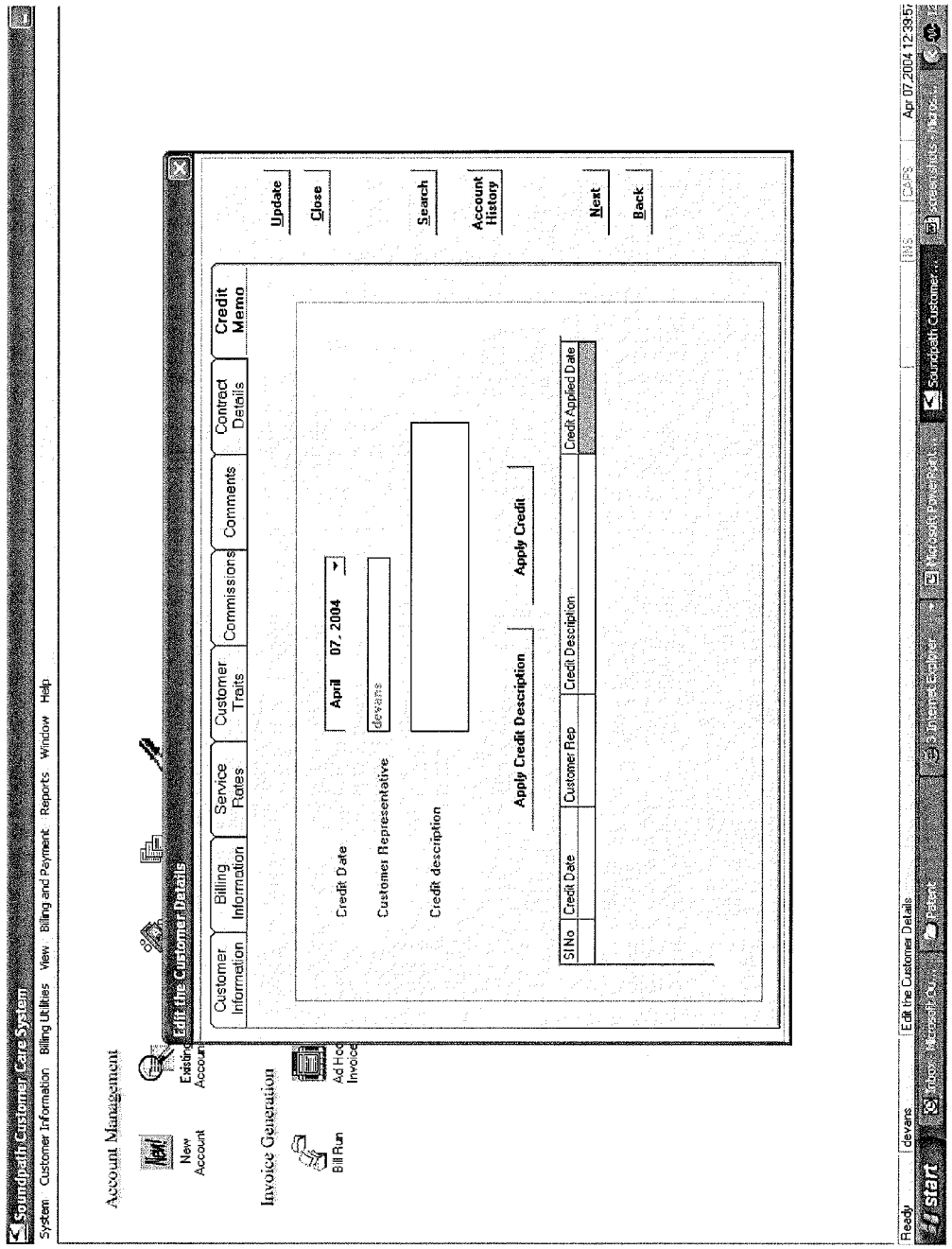
FIG. 7H is a screen shot of a sample credit memo screen, consistent with an embodiment of the present invention.

FIG. 7H is a screen shot of a sample credit memo screen, consistent with an embodiment of the present invention. Credit memo 714 may be used to log a credit for an account, including data such as credit amount, credit date, customer representative, and credit description. It may also be used to apply a customer credit that has been logged but not processed.

One skilled in the art will appreciate that the components depicted as being part of customer information 502 may be accessed from other parts of billing system 300 (e.g., from system administration 500). Furthermore, customer information 502 may include fewer or more components than are depicted in FIG. 7, the components may be combined or separated differently, and the components may be implemented in software and/or hardware.

Figure 8:
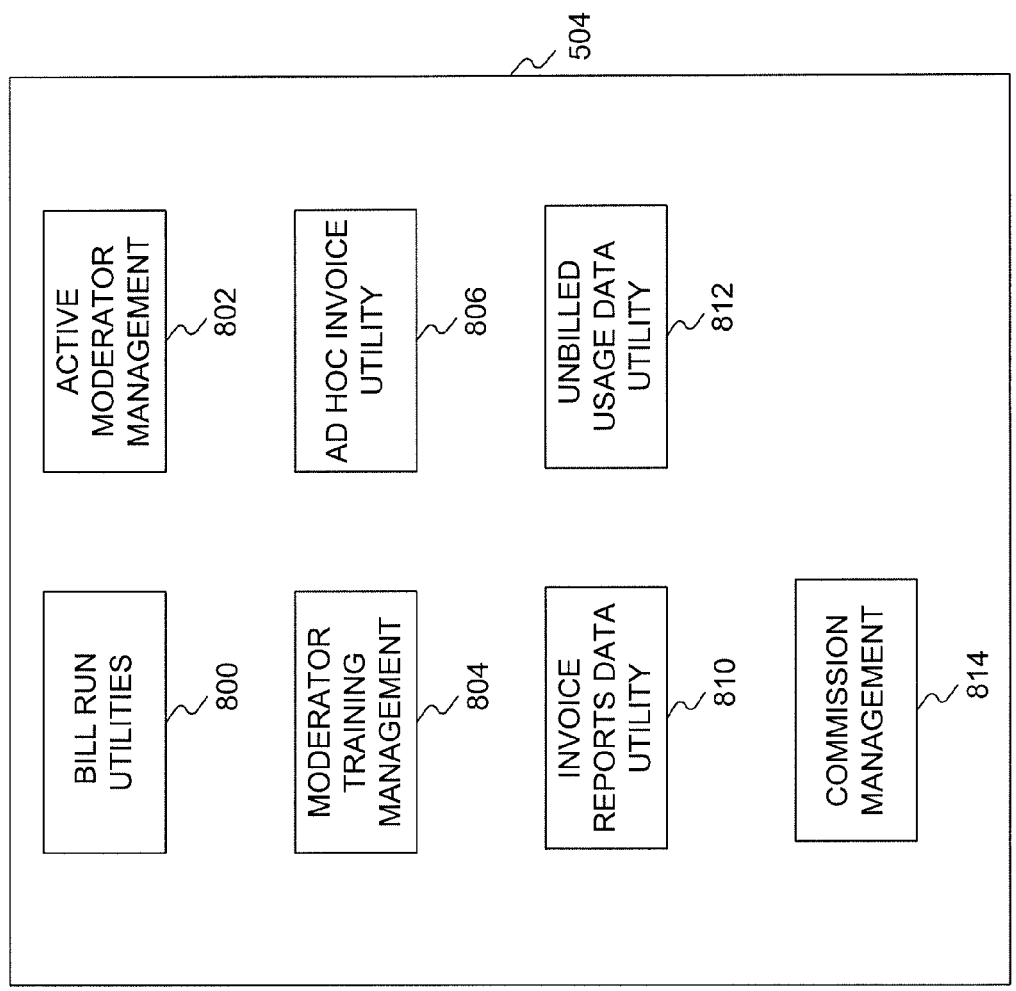
FIG. 8 is a block diagram of system billing utilities, consistent with an embodiment of the present invention.

FIG. 8 is a block diagram of system billing utilities 504, consistent with an embodiment of the present invention. An administrator of billing system 300 may use system billing utilities 504 to support moderators associated with customers 100, obtain conference details from conference facilities 102, and create data to support billing system 300. System billing utilities 504 includes components such as bill run utilities 800, active moderator management 802, moderator training management 804, ad hoc invoice utility 806, invoice reports data utility 810, unbilled usage data utility 812, and commission management 814. The components of system billing utilities 504 may be presented, for example, as entries in a drop-down list accessed via a system billing and payment tab on a graphical user interface, and may be implemented in hardware and/or software.

By selecting bill run utilities 800, an administrator or user may run utilities to generate customer bills. The administrator may upload active moderator data using active moderator management 802 or moderator training information using moderator training management 804. As discussed above, billing system 300 may track data regarding moderators such as conference usage and whether a moderator has been trained. Using ad hoc invoice utility 806, a user of billing system 300 may create an invoice for a customer outside the periodic bill run. Ad hoc invoice utility 1402 is described in greater detail below with reference to FIG. 12.

The administrator may also create invoice reports data using invoice reports data utility 810 or may create unbilled usage data using unbilled usage data utility 812. These processes are described in greater detail below with reference to FIGS. 10 and 11. Commission management 814 enables an administrator to calculate and apply commission payments for salespeople, e.g., using commission schedules created using commissions 708.

One skilled in the art will appreciate that the components depicted as being part of system billing utilities 504 may be accessed from other parts of billing system 300 (e.g., from system billing and payment 508). Furthermore, system billing utilities 504 may include fewer or more components than are depicted in FIG. 8, the components may be combined or separated differently, and the components may be implemented in software and/or hardware.

Figure 9:
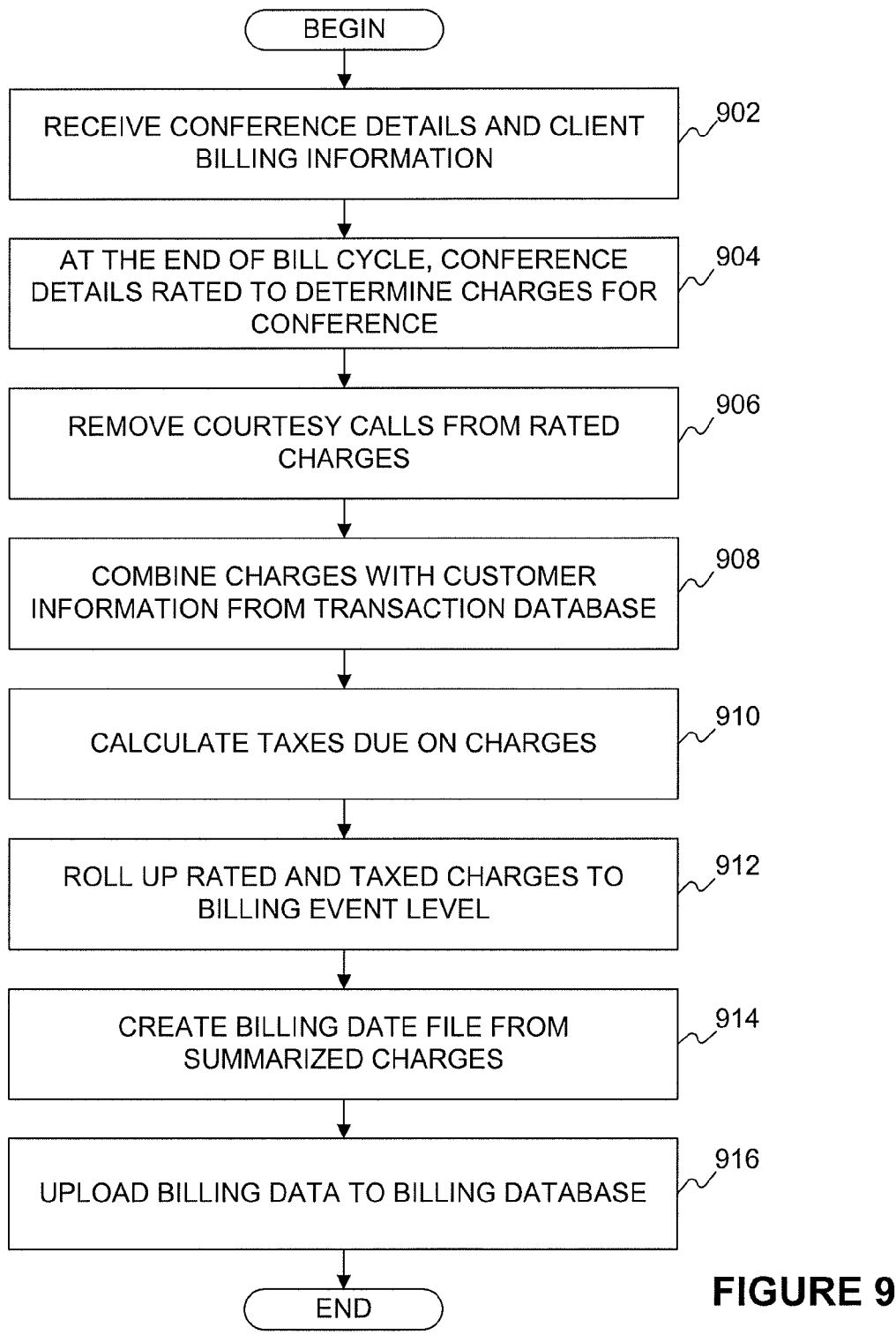
FIG. 9 is a flow chart of a process generating customer billing data, consistent with an embodiment of the present invention.

FIG. 9 is a flow chart of a process consistent with the present invention for generating customer billing data. For example, bill run utilities 800 may be used to perform the process shown in FIG. 9. As discussed above, in one embodiment, when a conference moderator accesses conference facility 102, he may provide client billing information and conduct a conference. Further, conference facility 102 may generate conference details for the conference. For an audio conference facility, the conference details may be, for example, CDRs. To begin creating customer billing data, utility 800 receives conference details including client billing information (step 902). Utility 800 may receive conference details and client billing information from, for example, conference facility 102, customer 100, or another CSP 104.

At the end of a bill cycle, conference details may be rated by system billing utilities 504 to determine charges for conferences (step 904). System billing utilities 504 may remove courtesy calls from the rated charges (step 906). For example, CSP 104 may remove any charges for conferences including only one participant as a courtesy to customers 100. Typically, such a conference occurs when a moderator is testing the system or is in training. Alternatively, no courtesy calls may be removed from the rated charges. After the rated charges are combined with customer information stored in transaction database 306 (step 908), system billing utilities 504 calculates the taxes due on the rated charges (step 910). The taxes may be, for example, federal, state, and/or local taxes. Alternatively, the customer may be tax-exempt, and no taxes are calculated. The charges for each item may be rolled up at the billing event level (step 912). For example, ancillary costs, such as transcription charges, are added to usage charges to arrive at a summarized total charge for a conference. The summarized charges, along with rated and taxed conference details, are wed to create a billing data file (step 914), and the billing data file may be uploaded to billing database 308 (step 916). In this way, bill run data has been created by system billing utilities 504 and the billing data is available via billing database 308 to billing system 300. Further, the billing data may be stored in transaction database 306 or elsewhere.

Figure 10:
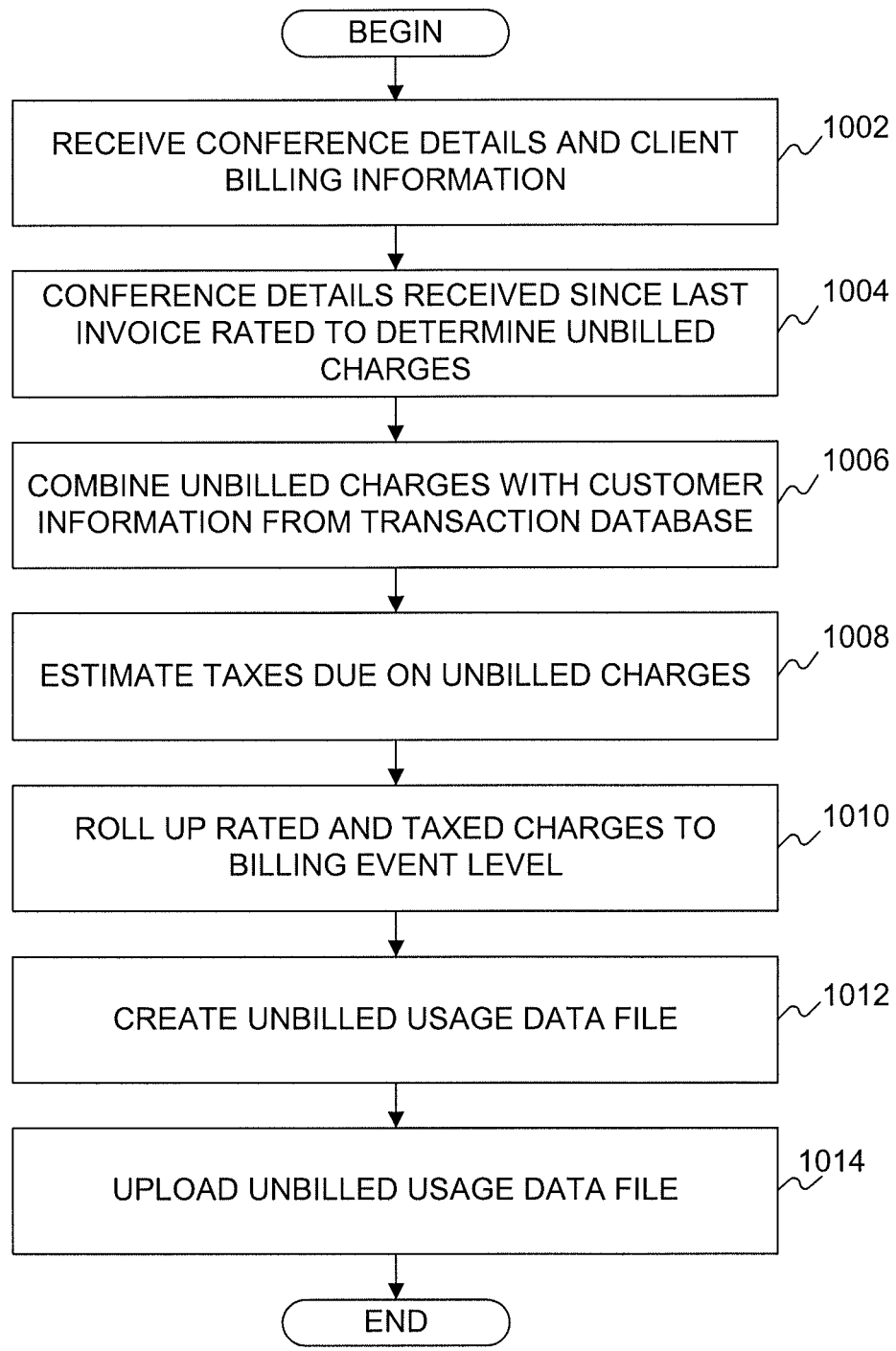
FIG. 10 is a flow chart of a process for creating unbilled usage data, consistent with an embodiment of the present invention.

FIG. 10 is a flow chart of a process for creating unbilled usage data consistent with an embodiment of the present invention. For example, unbilled usage data utility 812 may perform the process described in FIG. 10. Conference details including the client billing information are received (step 1002), e.g., from conference facility 102, customer 100, or another CSP 104. In one embodiment, CSP 104 may receive conference details via conference facility interface 312 on a regular basis, such as once a week or once a month. In another embodiment, conference details may be received each time a conference is completed or upon request.

To create unbilled usage data, billing system 300 uses unbilled usage data utility 812 to rate the conference details received since the last invoice to determine unbilled charges (step 1004). For example, billing system 300 may determine, for a customer, when the customer's last invoice was generated by searching transaction database 306. Once the unbilled charges are determined, they are combined with customer information from transaction database 306 (step 1006). The customer information may include, for example, a rate charged to the customer (e.g., $0.05 per minute) or the tax status (e.g., taxable or tax-exempt) of the customer.

If the customer is taxable, billing system 300 estimates the taxes due on the unbilled charges (step 1008). The tax estimation may include, for example, federal taxes, state taxes, and/or local taxes. The taxed and rated charges are rolled up to the billing event level (step 1010), and may include costs for ancillary services related to the conference, such as transcription, translation, etc., and usage charges. Once the charges are summarized, a file, such as a text file, is created (step 1012) and uploaded (step 1014), for example, to billing database 308, transaction database 306, or an online reports database. Customer 100 or an administrator at CSP 104 may then access the data to determine unbilled usage charges.

Figure 11:
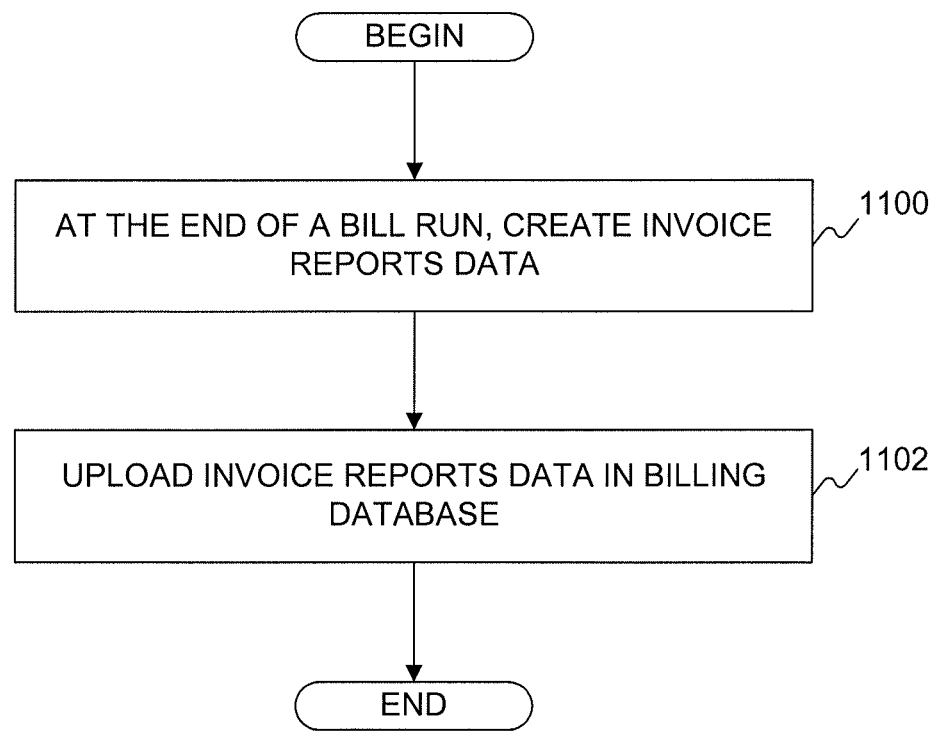
FIG. 11 is a block diagram of a process for creating invoice reports data, consistent with an embodiment of the present invention.

FIG. 11 is a flow chart of a process for creating invoice reports data consistent with an embodiment of the present invention. Using bill run utility 800, a user of billing system 300 may initiate a bill run to generate invoices for customers. For example, a bill run may be executed after a predetermined invoice cycle, such as once per month. At the end of a bill run, invoice reports data is created (step 1100). The invoice reports data may be stored in billing database 308, transaction database 306, or an online reports database (step 1102).

Figure 12:
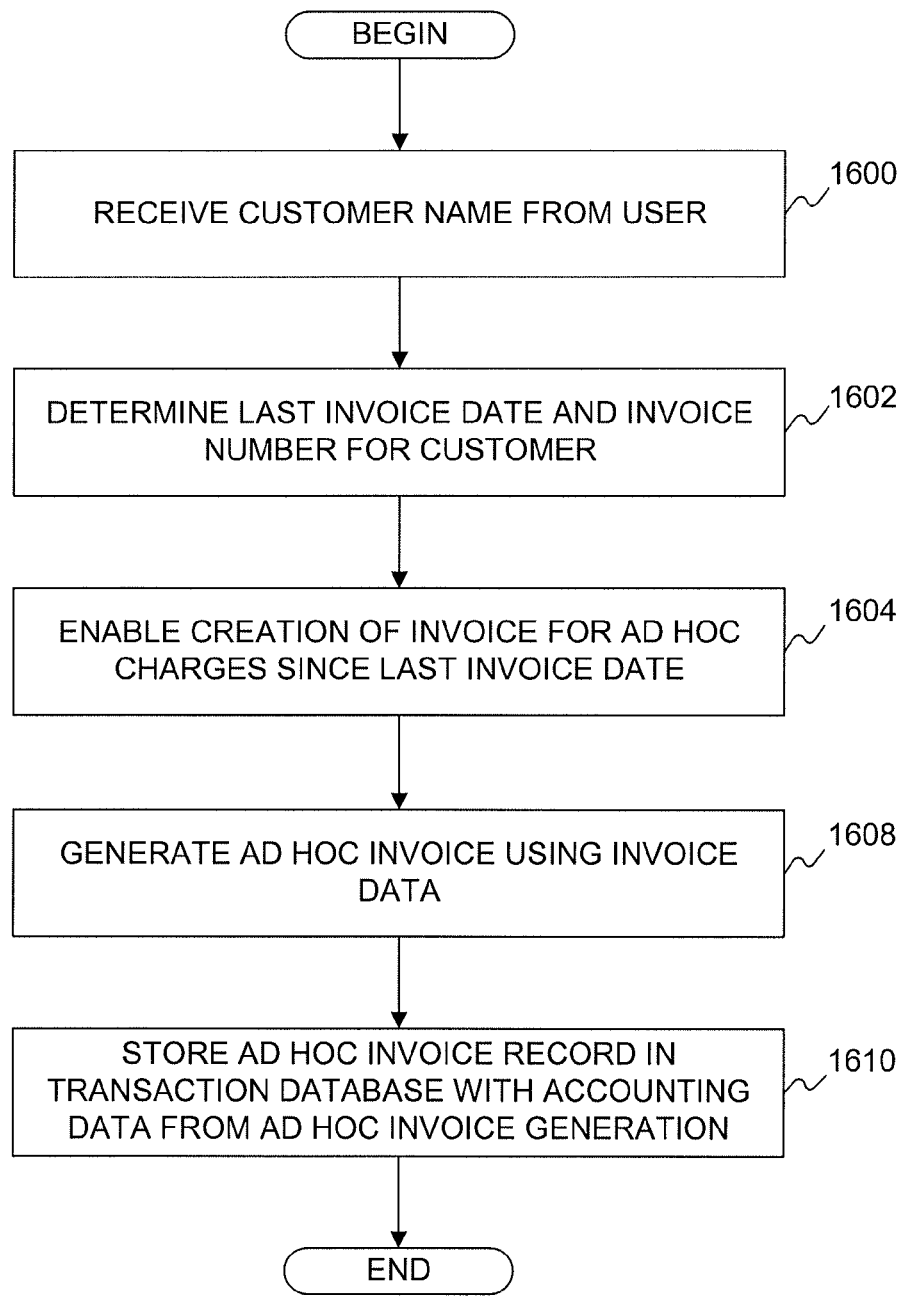
FIG. 12 is a block diagram of a process for creating an ad hoc invoice, consistent with an embodiment of the present invention.

FIG. 12 is a flow chart of a process for creating an ad hoc invoice consistent with an embodiment of the present invention. Using ad hoc invoice utility 806, a user of billing system 300 may generate an invoice for a customer outside the invoice cycle. Alternatively, the user may generate an ad hoc invoice for a customer as part of the invoice cycle, for example, when the customer's data has been edited and a new invoice is needed. The user may select a customer name for the ad hoc invoice (step 1600), for example, from a list of customers. For the selected customer, billing system 300 determines the last invoice date and invoice number (step 1602) and enables creation of an invoice for ad hoc charges since the last invoice date (step 1604). The data required for the creation of ad hoc invoices may be manually inputted by a user or obtained from a process similar to a bill run. An ad hoc invoice may then be generated using the invoice data (step 1608). In one embodiment, customer information, such as customer's name, billing address, etc., may be combined with the invoice data to create the ad hoc invoice. Once the ad hoc invoice has been created, ad hoc invoice records may be created including accounting data from the ad hoc invoice creation and stored, for example, in transaction database 306 (step 1610).

Figure 13:
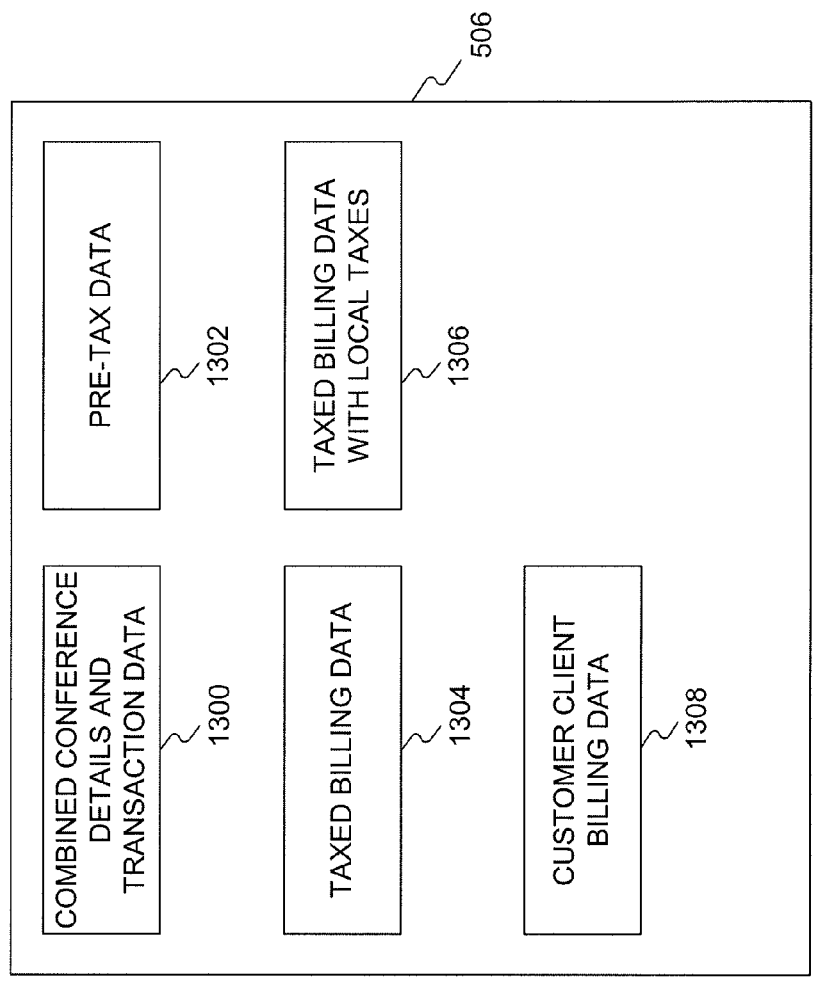
FIG. 13 is a block diagram of data access in greater detail, consistent with an embodiment of the present invention.

FIG. 13 is a block diagram of data access 506 consistent with an embodiment of the present invention. Data access 506 handles data that is available to billing system 300, using components such as combined conference details and transaction data 1300, pre-tax data 1302, taxed billing data 1304, taxed billing data with local taxes 1306, and customer client billing data 1308. As described above, CSP 104 may generate combined conference details and transaction data for component 1300 in the course of running bill run utility 800. This data may be stored, for example, in billing database 308 and may be used by billing system 300. For example, as described above with reference to FIG. 9, billing system 300 uses conference details and transaction data 1300 in creating billing data.

Similarly, components including pre-tax data 1302, taxed billing data 1304, taxed billing data with local taxes 1306, and customer client billing data 1308 may be used by billing system 300 to support, for example, invoice data creation. Via the components of data access 506, users of billing system 300 may access data at any stage in the billing process. In one embodiment, customers 100 may also access data using the components depicted in FIG. 13. For example, customer client billing data 1308 may be made available to generate a data file that a customer may automatically enter into the customer's own client billing system. This example is described in greater detail below with reference to FIGS. 17-20.

Figure 14:
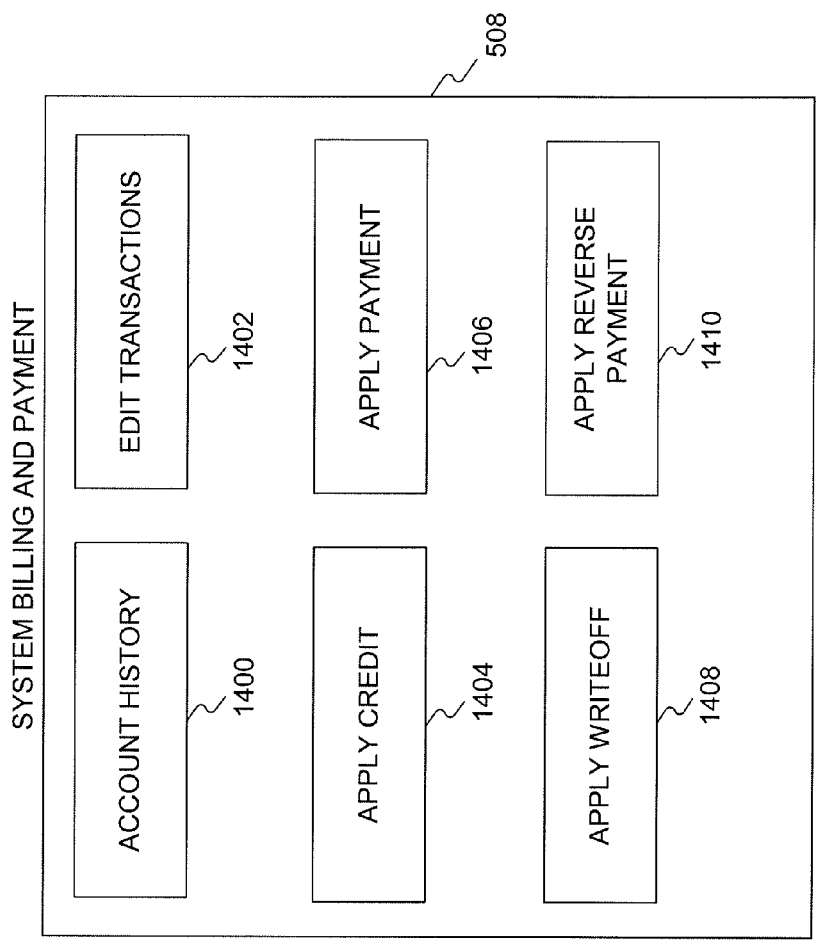
FIG. 14 is a block diagram of customer transactions in greater detail, consistent with an embodiment of the present invention.

FIG. 14 is a block diagram of customer transactions 508 in greater detail, consistent with an embodiment of the present invention. Customer transactions 508 may include components providing tools for billing system 300 such as account history 1400 and edit transactions 1402. The components of customer transactions 508 may be presented, for example, as entries in a drop-down list accessed via a system billing and payment tab on a graphical user interface. A user of billing system 300 may use account history 1400 to find and view the account history of customer 100. For example, the user may enter a customer name or identifier, e.g., by selecting it from a drop-down list of customers. An account history screen may then display information about the customer, such as a balance due, a customer identifier, and a list of transactions created for the customer. The user may be able to select an invoice from the list to view details about the invoice, such as the invoice number, conferences billed, balance due, payments, credits, write offs, etc. The user may also be able to view details about each conference listed on an invoice, such as services provided, conference dates, conference times, number of participants, etc.

A user of billing system 300 may select edit transactions 1402 to edit transactions for customer 100. The user may enter a customer name or identifier, e.g., by selecting it from a drop-down list of customers. From a list of transactions for the selected customer, the user may choose a transaction to be edited and may edit data, such as a payment amount, check number, credit amount, transaction type (e.g., payment, credit, or write-off), etc.

A user of billing system 300 may also use tools in customer transactions 508 to manage transactions for customer accounts. For example, the user may select apply credit 1404 to post a credit (e.g., to correct an erroneous charge) to an account. The user may also select apply payment 1406 to apply a payment received from a customer to the customer's account. The user may select apply write-off 1408 to apply a write-off to a customer's account (e.g., to remove a balance that is unlikely to be paid). Finally, the user may select apply reverse payments 1410 to undo a payment incorrectly applied.

One skilled in the art will appreciate that the components depicted as being part of customer transactions 508 may be accessed from other parts of billing system 300 (e.g., from system administration 500). Furthermore, customer transactions 508 may include fewer or more components than are depicted in FIG. 14, the components may be combined or separated differently, and the components may be implemented in software and/or hardware.

Figure 15:
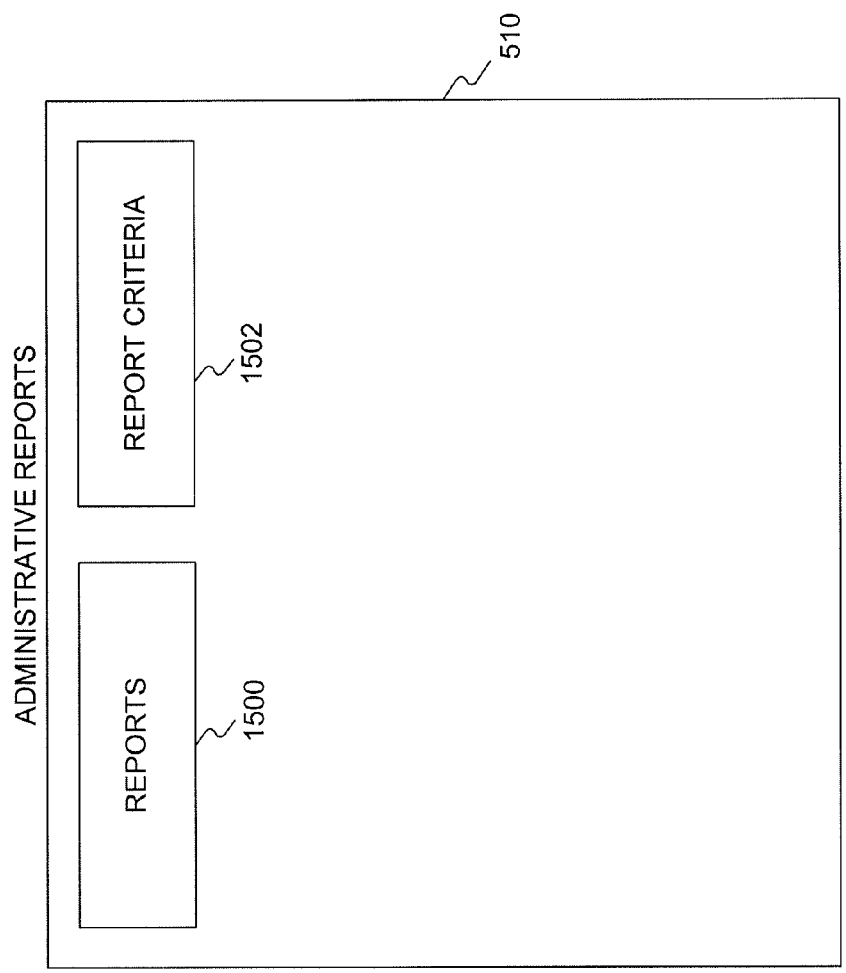
FIG. 15 is a block diagram of administrative reports in greater detail, consistent with an embodiment of the present invention.

FIG. 15 is a block diagram of administrative reports 510 in greater detail, consistent with an embodiment of the present invention. Administrative reports 510 may include components such as reports 1500 and report criteria 1502 to provide reporting capability to billing system 300. Data used by any components of CSP 104, such as billing system 300, may be compiled and presented using reports 1500. Reports 1500 may be listed, for example, as entries in a drop-down list accessed via a reports tab on a graphical user interface.

Figure 16A:
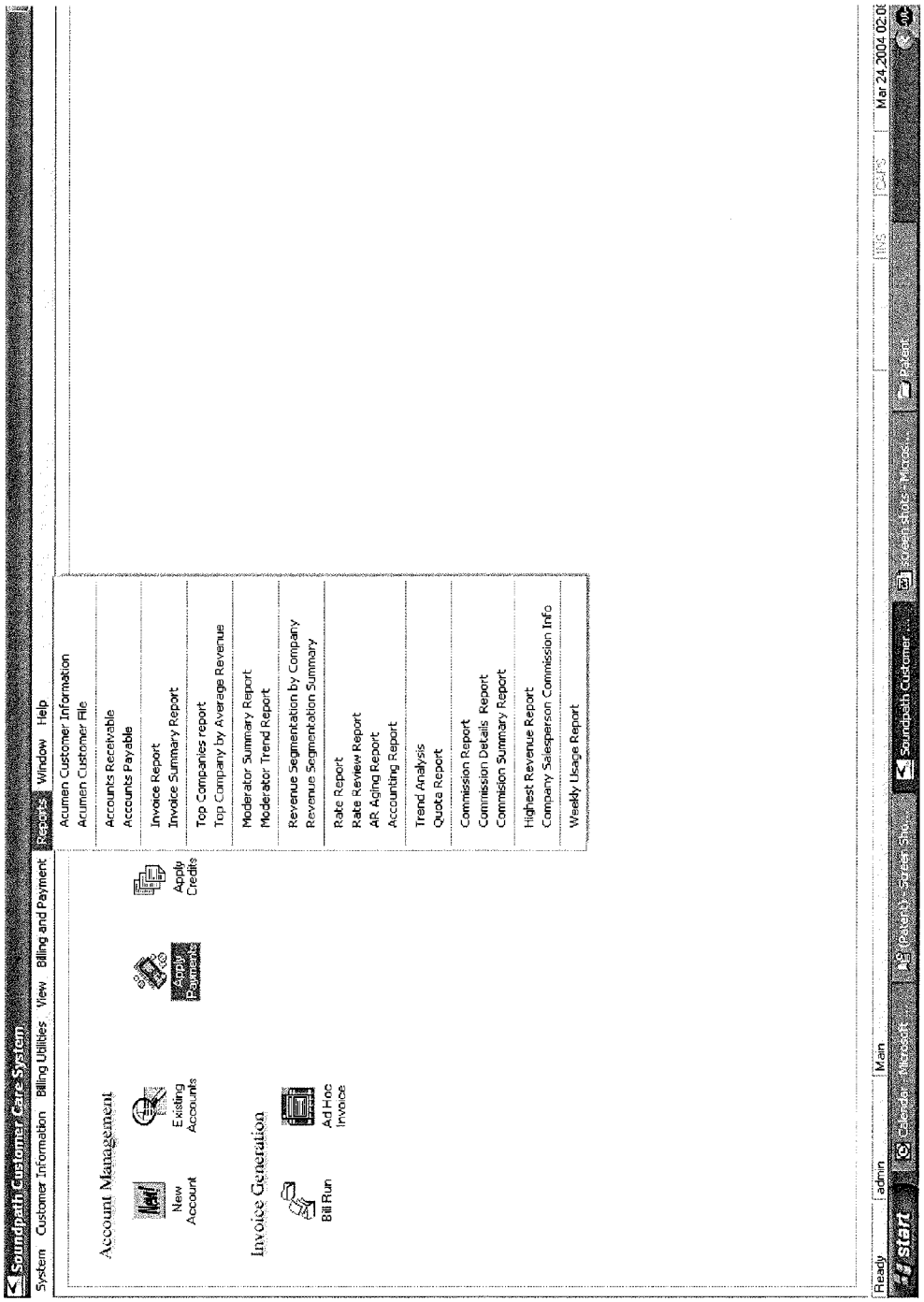
FIG. 16A is a screen shot of a sample drop-down list of reports, consistent with an embodiment of the present invention.

FIG. 16A is a screen shot of a sample drop-down list of reports 1500, consistent with an embodiment of the present invention. When a user selects a report, billing system 300 generates the report and displays it. The user may obtain a copy of the report by, for example, printing, downloading, e-mail, etc. Reports 1500 may include, for example, accounting reports for the CSP, such as an accounts receivable report; reports summarizing conference usage by customers, such as a top companies report or moderator summary report; and reports for CSP salespeople, such as a commission details report. Of course, other reports than those listed in FIG. 16A or fewer reports than those listed may be used consistent with the present invention.

Reports 1500 may be generated using report criteria 1502. In this way, a user of billing system 300 may dynamically create or revise reports 1500. For example, after selecting the type of report, the user may select report criteria such as report start date, report end date, company or companies, etc. In one embodiment, a dialog box may be displayed to facilitate entry of data for report criteria 1502.

Figure 16B:
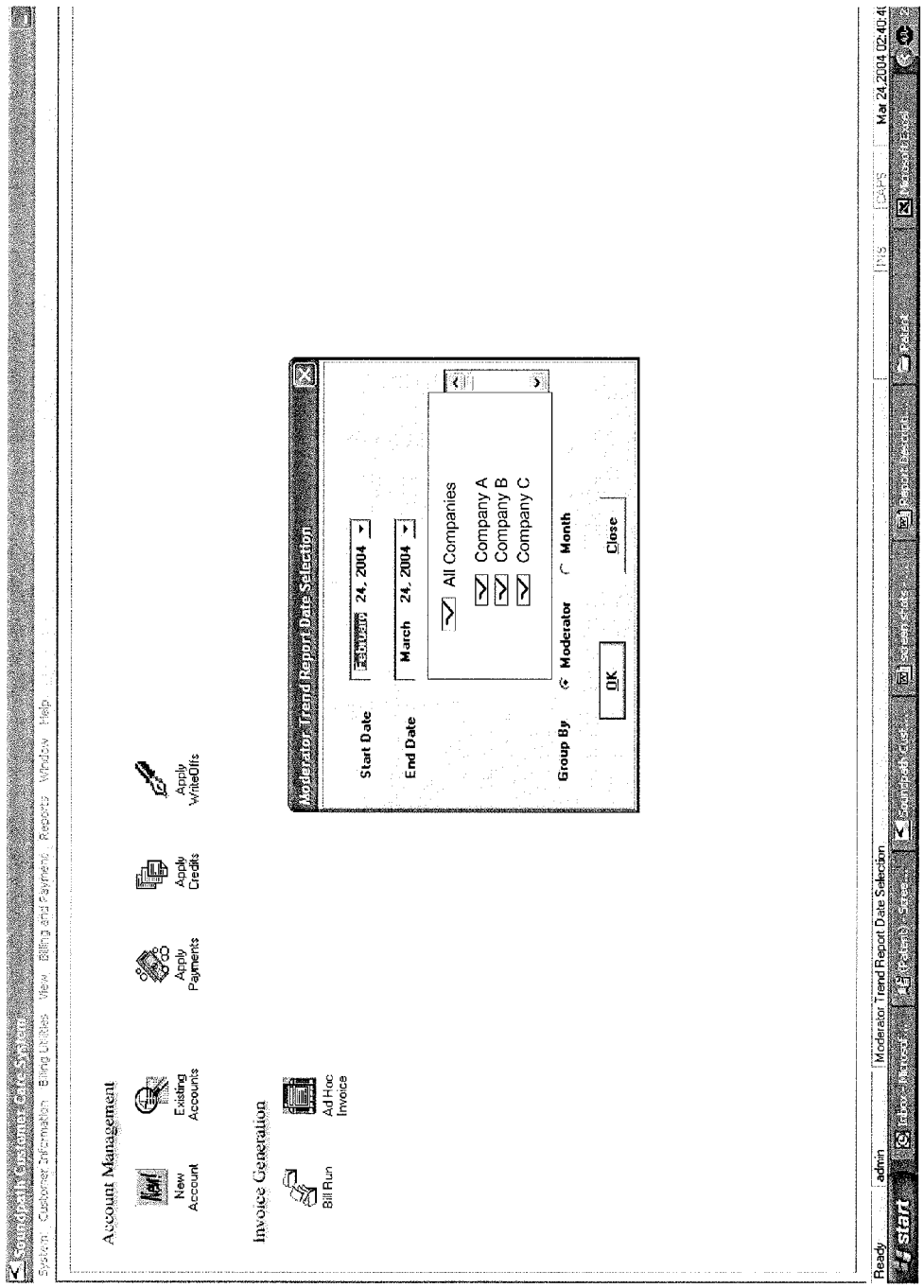
FIG. 16B is a screen shot of a sample dialog box for entering report criteria, consistent with an embodiment of the present invention.

FIG. 16B is a screen shot of a sample dialog box for entering data for report criteria 1502, consistent with an embodiment of the present invention. For a moderator trend report, the dialog box enables the user to choose a start date and end date. To assist the user, only dates within an acceptable range may be presented as options in the dialog box. The user may also select one or more companies for the report or may select a single checkbox designating all companies. The user may further specify whether the report data is grouped by moderator or by month. Of course, other options for creating and customizing the report may also be used consistent with the present invention.

One skilled in the art will appreciate that the components depicted as being part of administrative reports 510 may be accessed from other parts of billing system 300 (e.g., from system administration 500). Furthermore, administrative reports 510 may include fewer or more components than are depicted in FIG. 15, the components may be combined or separated differently, and may be implemented in hardware and/or software.

C. Billing Data Interface

Systems consistent with the present invention include a billing data interface to provide billing data to customers in an accurate and efficient manner. Billing data may be processed to preserve client billing information and to meet a customer's individual data requirements. The billing data may be presented in such a way that the customer may input the billing data directly into its client billing system or into a cost recovery system.

Figure 17:
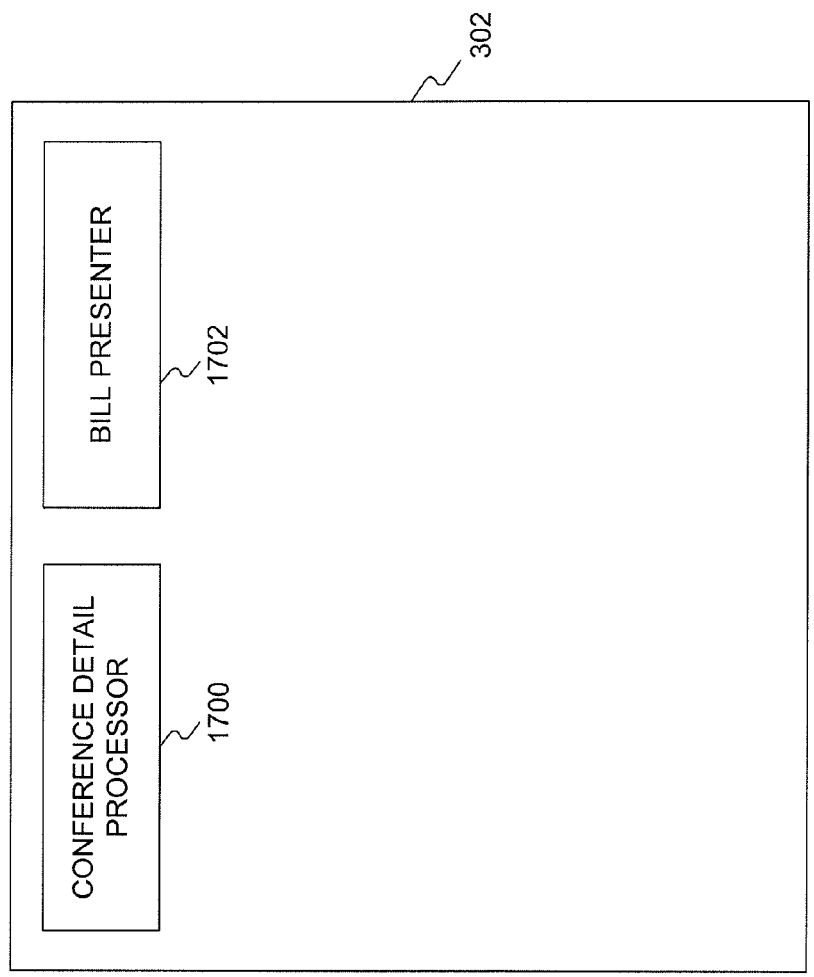
FIG. 17 is a block diagram of a billing data interface in greater detail, consistent with an embodiment of the present invention.

FIG. 17 is a block diagram of billing data interface 302 in greater detail, consistent with an embodiment of the present invention. Billing data interface 302 automates conference billing between CSP 104 and customers 100. In particular, billing data interface 302 prepares billing data for a customer in a way that preserves the customer's client billing information. Furthermore, billing data interface 302 presents billing data to a customer so that the billing data may be used by the customer with little or no manipulation needed on the part of the customer. To provide these functions, billing data interface includes a conference detail processor 1700 and a bill presenter 1702. As explained in greater detail below, conference detail processor 1700 processes conference details (e.g., CDRs and client billing information received from conference facilities) to prepare billing data for customers. Bill presenter 1702 may be used to obtain billing data at the customer's request.

One skilled in the art will appreciate that the components depicted as being part of billing data interface 302 may be accessed from other parts of billing system 300 (e.g., from system billing and payment 508). Furthermore, billing data interface 302 may include fewer or more components than are depicted in FIG. 17, the components may be combined or separated differently, and the components may be implemented in software and/or hardware.

Figure 18:
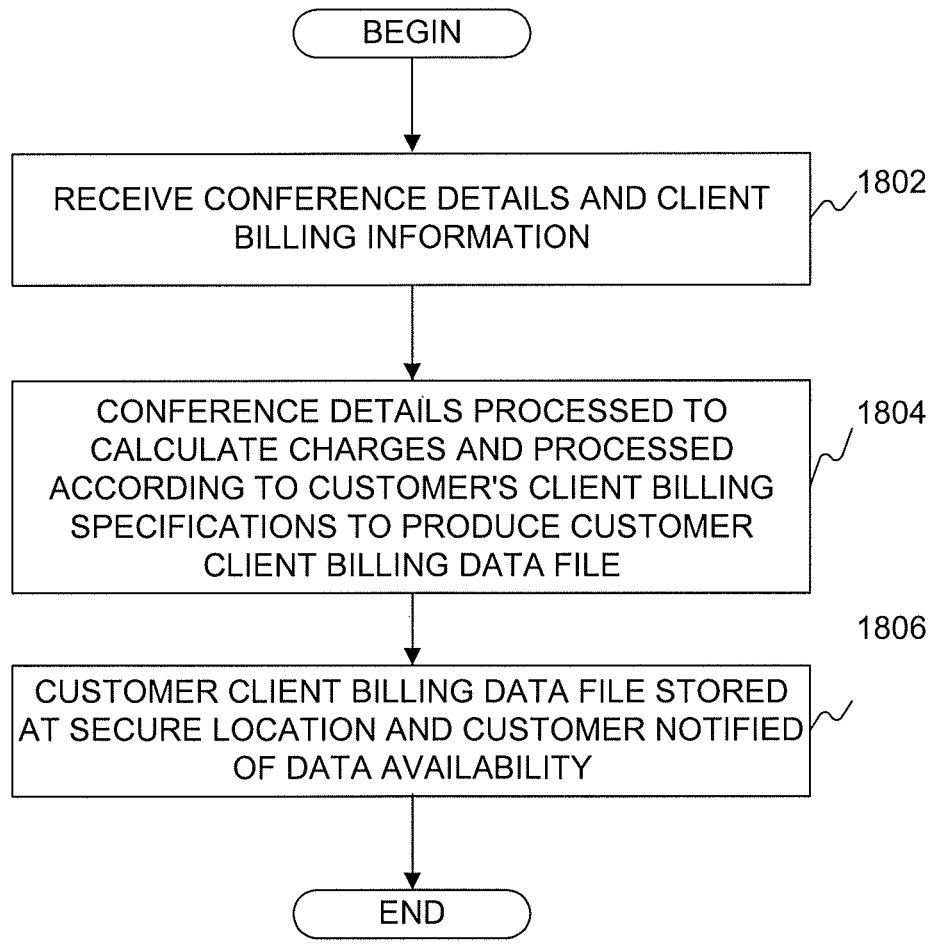
FIG. 18 is a flow chart of processing performed by a conference detail processor, consistent with an embodiment of the present invention.

FIG. 18 is a flow chart of processing performed by conference detail processor 1700 consistent with an embodiment of the present invention. Conference details and client billing information are received (step 1802), e.g., from conference facility 102, customer 100, or a CSP 104. As described above, in one embodiment, when a conference moderator accesses conference facility 102, he enters client billing information for a conference, and conference facility 102 generates conference details for the conference. The conference details are processed to calculate charges and also processed according to the customer's client billing specifications 204 to produce a customer client billing data file (step 1804). The creation of customer billing data is described in greater detail below with reference to FIG. 19. Once the client billing data file is created, it is stored at a secure location and a notification is sent, e.g., to the customer (step 1806). For example, the client billing data file may be stored in transaction database 306 or on a separate secure server implementing the secure socket layer protocol. The customer notification may be sent, for example, by e-mail and may include instructions for downloading the client billing data file. In one embodiment, the client billing data file is stored such that the customer may download it from the secure location using a secure login and password to access the secure location. Alternatively, the customer client billing data file may be delivered to the customer in other ways, such as attached to an e-mail or on a disk. Because conference detail processor 1700 has implemented the customer's client billing specifications 204, the customer client billing data file may be directly input into client billing system 200, e.g., by customer 100 or CSP 104. The customer does not have to spend time manually manipulating the data or tracking down client billing information or project codes, saving the customer time and effort and improving the accuracy of customer client billing.

Figure 19:
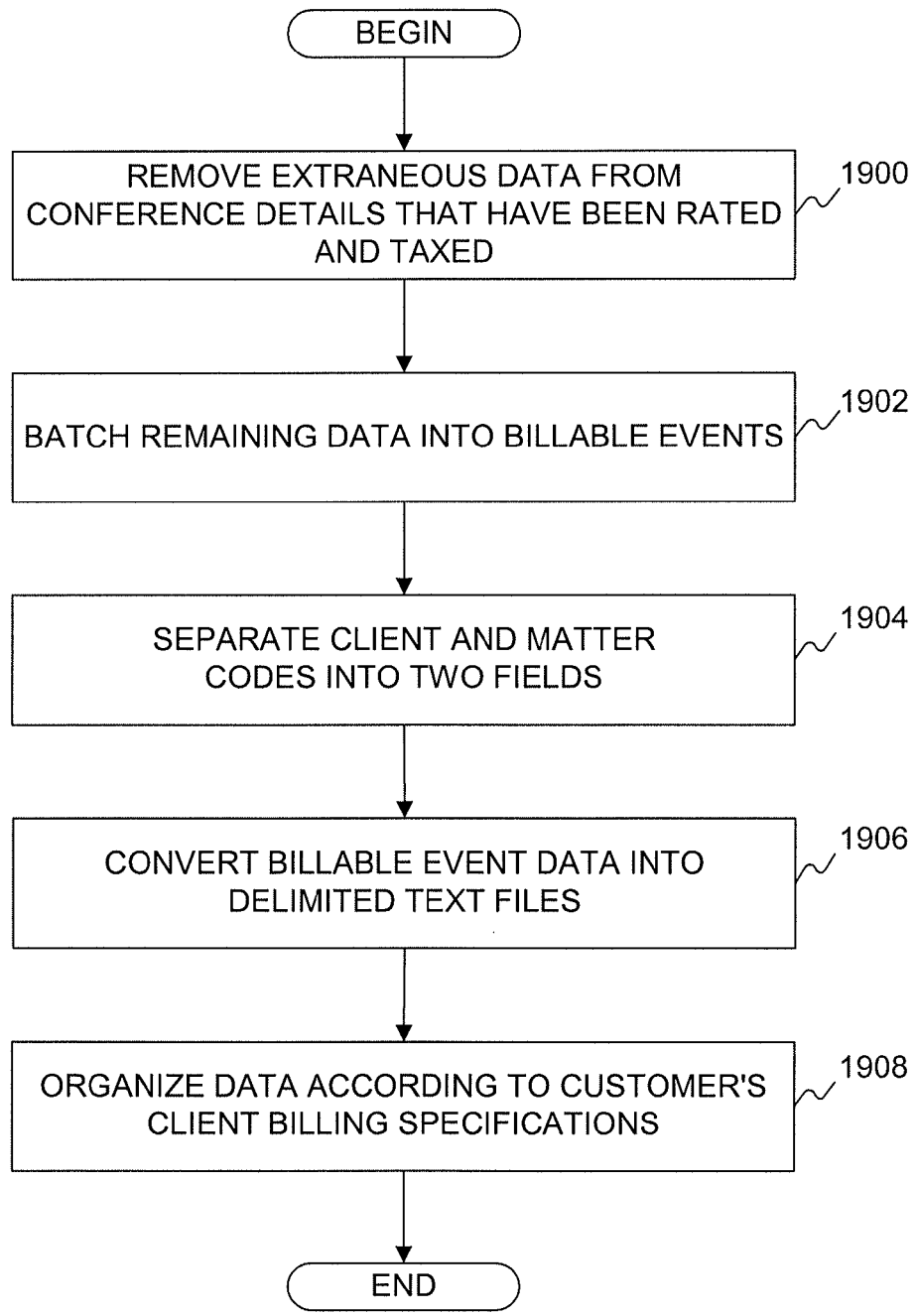
FIG. 19 is another flow chart of processing performed by a conference detail processor, consistent with an embodiment of the present invention.

FIG. 19 is a flow chart of the processing performed by conference detail processor 1700 (e.g., step 1804 on FIG. 18), consistent with an embodiment of the present invention. As part of its processing, conference detail processor 1700 removes extraneous data from the conference details that have been rated and taxed (step 1900). For example, audio conference CDRs contain many fields that are irrelevant to a customer for purposes of client billing, and conference detail processor 1700 automatically removes the irrelevant information. The remaining data is batched into billable events (e.g., individual conferences) (step 1902). Any other client billing specifications 204 are also implemented. For example, client billing specifications 204 may specify data fields and file formats that are compatible with the customer's client billing system 200. Client billing specifications 204 may dictate that a billing data file have separate data fields for a client code and a matter code. In this case, the client code and matter code are separated into two fields (step 1904). The data is then converted into a format compatible with the customer's client billing system 200, such as delimited text files (step 1906). Finally, the data may be organized according to the client billing specifications 200 (step 1908). For example, the data may be sorted into an order required by the customer's client billing system 202. In one embodiment, conference detail processor may preserve the data according to the customer's client billing specifications 204. For example, leading zeros in a data fields, such as client code, may be preserved.

Figure 20:
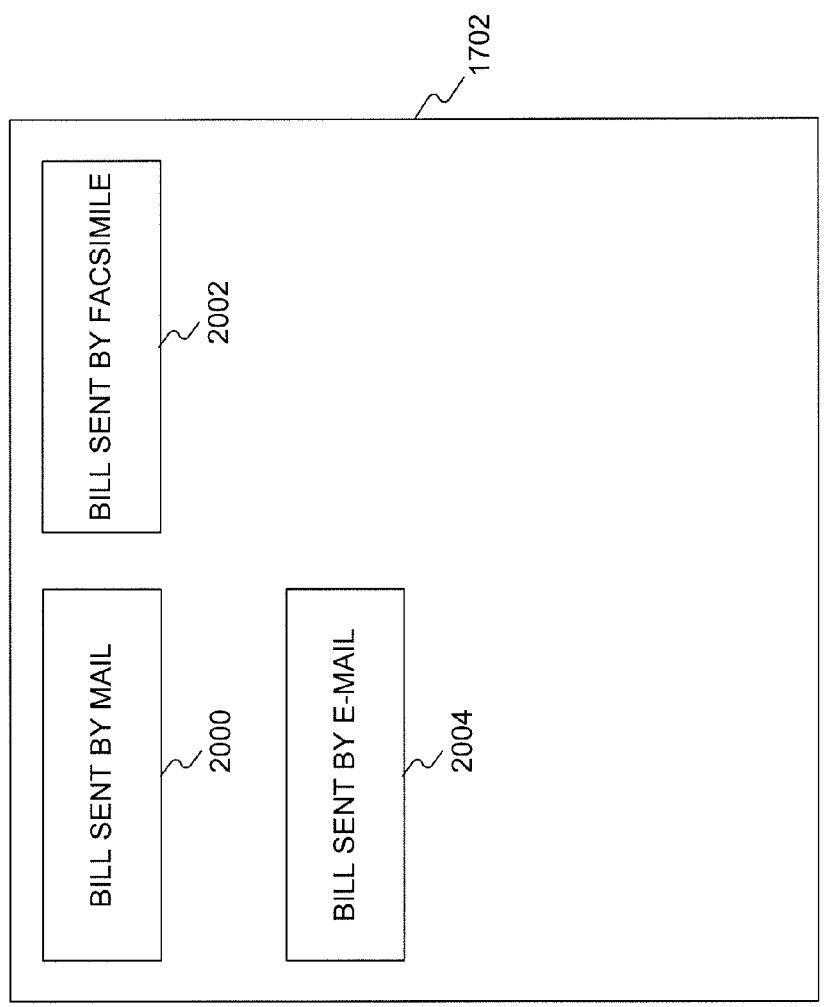
FIG. 20 is a block diagram of a bill presenter in greater detail, consistent with an embodiment of the present invention.

FIG. 20 is a block diagram of bill presenter 1702 in greater detail, consistent with an embodiment of the present invention. A customer may wish to receive billing data in ways other than downloading the client billing data file. For example, the customer may request a bill sent by mail 2000, a bill sent by facsimile 2002, a bill sent by e-mail 2004, etc. The "paper" bill may include the same raw data as the client billing data file for use by the customer or may include more or less than all the conference details data. The billing data also may be presented to the customer in a non-text format such as Excel or HTML.

D. Online Reporting Tool

Systems consistent with the present invention include an online reporting tool to present conferencing data to customers 100 in a useful and flexible manner. Customers 100 may customize standard reports using dynamic, comprehensive search criteria. Customers 100 may also create ad hoc reports as needed. Furthermore, customers 100 may access unbilled usage data and conduct searches on the unbilled usage data.

Figure 21:
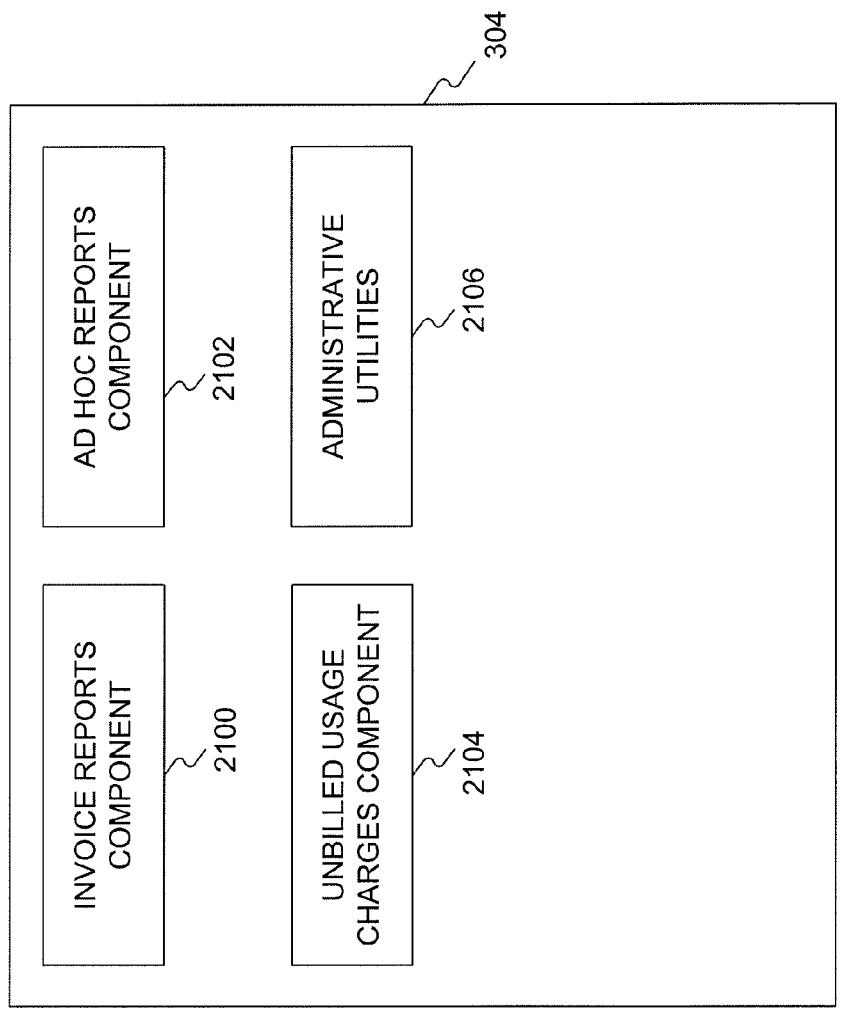
FIG. 21 is a block diagram of an online reporting tool in greater detail, consistent with an embodiment of the present invention.

FIG. 21 is a block diagram of online reporting tool 304 in greater detail, consistent with an embodiment of the present invention. Online reporting tool 304 enables customers 100 to create and view reports. Customers 100 may choose to display reports, receive reports by e-mail, receive paper reports by facsimile or mail, receive reports on disk or by download, etc. Online reporting tool 304 includes invoice reports component 2100, ad hoc reports component 2102, unbilled usage charges component 2104, and administrative utilities 2106, as described below. It may also include an online reports database (not shown).

One skilled in the art will appreciate that the components depicted as being part of online reporting tool 304 may be accessed from other parts of billing system 300 (e.g., from system billing and payment 508). Furthermore, online reporting tool 304 may include fewer or more components than are depicted in FIG. 21, the components may be combined or separated differently, and the components may be implemented in software and/or hardware.

Figure 22:
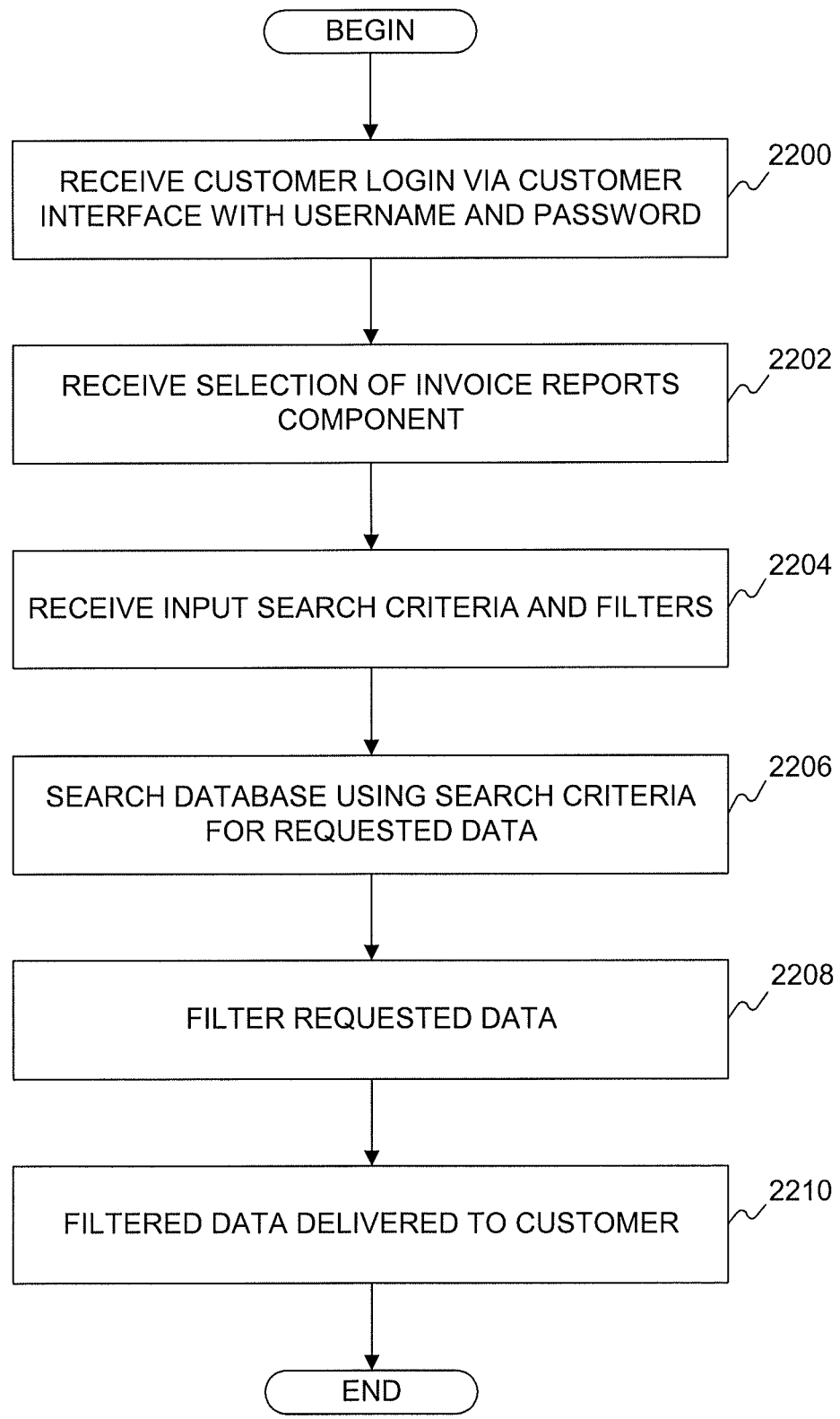
FIG. 22 is a flow chart of processing performed by invoice reports module, consistent with an embodiment of the present invention.

FIG. 22 is a flow chart of processing performed by invoice reports module 2100, consistent with an embodiment of the present invention. Online reporting tool 304 may use invoice reports component 2100 to present account data including historical billing information, e.g., to customers. A customer's login is received, with a username and password (step 2200), e.g., via customer interface 310. After receiving a selection of invoice reports component 2100 (step 2202), input search criteria and filters may be received (step 2204). Search criteria and filters may be based on data fields such as invoice date, office code, moderator, biller code, client code, matter code, etc.

The searching and filtering performed by invoice reports component 2100 may enable the customer to flexibly and dynamically access data. In one embodiment, invoice data may be organized in a hierarchy of offices, moderators, and billing codes (e.g., client code, matter code, project code, etc.) For example, a moderator may be identified by a biller code, belong to a single office, and work on several different billing codes. Similarly, a single billing code may be used by multiple moderators in multiple offices.

To assist the customer in formulating his search criteria, invoice reports component 2100 may present a series of search selections, e.g., using a series of graphical user interfaces including data entry boxes, drop-down lists, check boxes, etc. For example, upon receiving a selection of an invoice date to search for and a filter on a field such as office code, moderator, biller code, or billing code, invoice reports component 2100 may prompt a customer to further narrow the search criteria. For example, if the first filter received is office code, a prompt may be issued to choose a secondary filter from among moderator, biller code, or billing code. Once this second selection is made, a prompt may be issued to choose among the remaining fields to further narrow the search. In this way, a nested approach may be used to assist the customer in formulating the search criteria and filters for invoice reports component 2100.

In addition to selected fields to search and/or filters, invoice reports component 2100 may also receive values of the data in these fields to further refine a search/filter. For example, for the office code field, component 2100 may present the customer with a list of possible office codes from which to choose. After receiving a selection of a specific office code, component 2100 may continue to present search/filter options, all within the chosen office code. So, if the user next chooses moderator, he will be shown only the moderators corresponding to the chosen office code as he continues to formulate his search. At each step in the process of creating the search criteria/filters, component 2100 may receive a command to stop and generate an invoice report or to start over.

After receiving the customer's search criteria and/or filters, invoice reports component 2100 searches for the requested data using the search criteria (step 2206). For example, invoice reports component 2100 may search a database storing invoice reports data, such as transaction database 306 or a separate database. The data is then filtered (e.g., sorted or arranged) (step 2208) and delivered to the customer in the form of a report (step 2210). The data may be filtered, for example, according to the customer's preference or according to a standard filter corresponding to a selected report. The invoice report may be delivered to the customer by presenting it on a display or the report may be sent via e-mail, downloaded, etc. Invoice reports component 2100 may include standard report formats for presenting invoice data. Alternatively, a customer may create a custom report using ad hoc reports component 2102, as described below.

Figure 23:
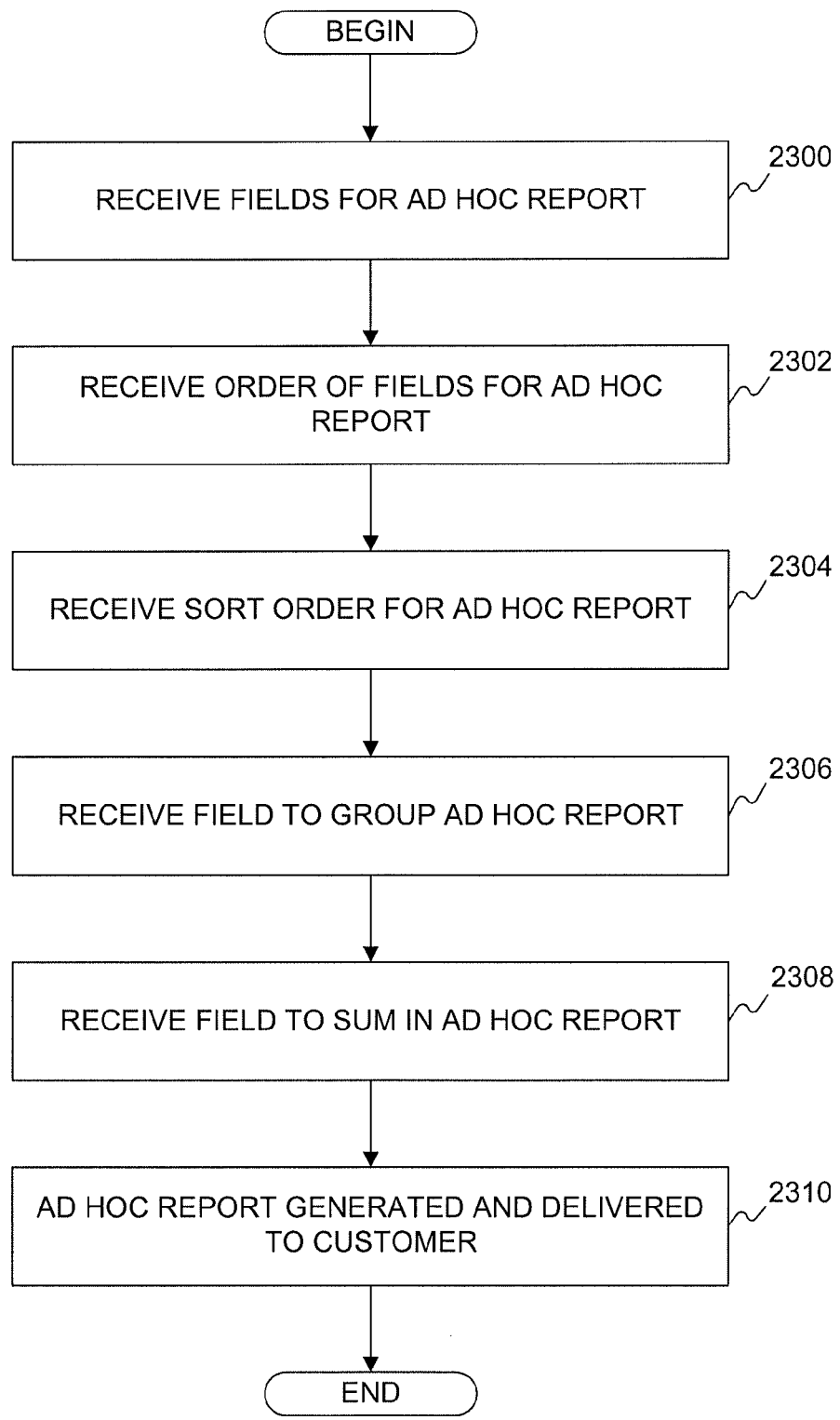
FIG. 23 is a flow chart of a process for a customer to create an ad hoc report, consistent with an embodiment of the present invention.

FIG. 23 is a flow chart of a process to create an ad hoc report for a customer, consistent with an embodiment of the present invention. A customer may use online reporting tool 304 to request the creation of a report meeting the customer's specifications. For example, ad hoc reports component 2102 may receive a field or fields for an ad hoc report, such as invoice date, invoice number, moderator, biller code, client code, etc. (step 2300). For example, component 2102 may present a graphical user interface including a list of all available fields from which the customer may choose. Ad hoc reports component 2102 may also receive an order in which the fields should appear on the ad hoc report (step 2302). For example, ad hoc reports component 2102 may display a list of selected fields and tools such as a "move up" or "move down" button for the customer to specify the field order. Further, a sort order for the ad hoc report may be received (step 2304). For example, ad hoc reports component 2102 may display a drop down list for the customer to select which of the chosen fields to sort the report by and a set of radio buttons to determine whether to sort in ascending or descending order. In one embodiment, ad hoc reports component 2102 may offer additional fields for a secondary or subsequent sort.

Ad hoc reports component 2102 may also receive a field or fields for grouping an ad hoc report (step 2406). For example, component 2102 may display a list of selected fields and tools such as a "move up" or "move down" button to specify the grouping order. Furthermore, ad hoc reports component 2102 may receive a selection of a field or fields in the ad hoc report for summing (step 2308). For example, component 2102 may display a list of fields capable of being summed (e.g., number of participants, total charges, etc.) from which the customer may choose. Finally, the ad hoc report is generated and delivered to the customer (step 2310). At each step in the process shown in FIG. 24, ad hoc reports component 2102 may receive a command to stop and generate the ad hoc report or to start over. The ad hoc report may be delivered to the customer by presenting it on a display or sending it via e-mail, downloading it, etc.

Figure 24:
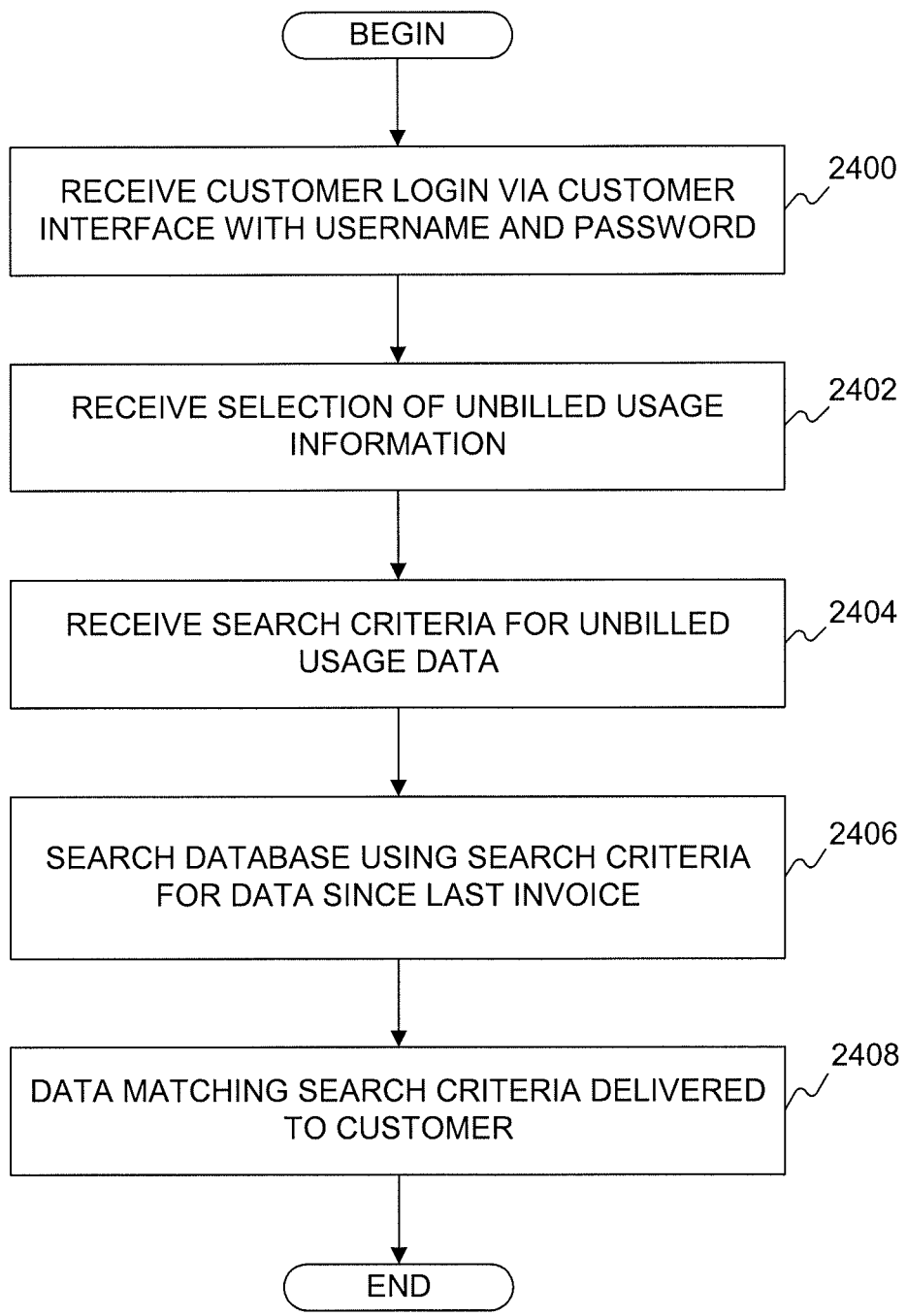
FIG. 24 is a flow chart of a process for providing unbilled usage charges to a customer, consistent with an embodiment of the present invention.

FIG. 24 is a flow chart of a process for providing unbilled usage charges to a customer, consistent with an embodiment of the present invention. Unbilled usage charges may include data about any conference service used by the customer but not yet billed. For example, unbilled usage charges may include charges for conferencing services since the last customer invoice was generated. Unbilled usage charges component 2104 may receive a customer login, with a username and password (step 2400), e.g., via customer interface 310, and a selection of unbilled usage charges component 2104 (step 2402). For the customer's unbilled usage data, component 2104 may receive search criteria (step 2404) such as all data, office code, moderator, biller code, or billing code. In one embodiment, component 2104 may present a list of possible search criteria for the customer to select from. Unbilled usage charges component 2104 searches for unbilled usage data matching the search criteria (step 2406) and delivers it to the customer (step 2408). The searching may be performed in a database storing unbilled usage charges, for example, transaction database 306 or a separate database. The data may be delivered to the customer by presenting it on a display or a generating a report that may be printed, downloaded, e-mailed, etc.

Figure 25:
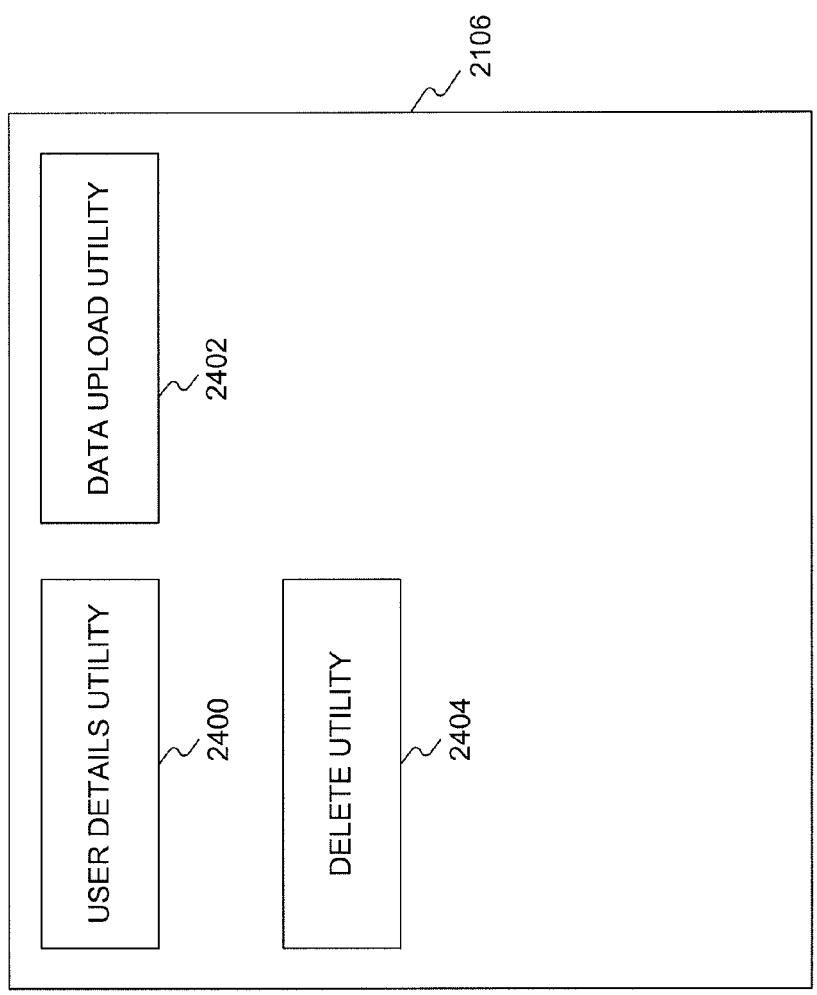
FIG. 25 is a block diagram of an administrative utilities in greater detail, consistent with an embodiment of the present invention.

FIG. 25 is a block diagram of administrative utilities 2106 in greater detail, consistent with an embodiment of the present invention. Administrative utilities 2106 enable a user, such as an administrator, to manage online reporting tool 304. These utilities include components such as a user details utility 2400, a data upload utility 2402, and a delete utility 2404. User details utility 2400 enables the administrator to enter, edit, or upload user details for users of online reporting tool 304, such as customer information, data, usernames, passwords, etc. User details utility 2400 may also enable the administrator to search for a data file, validate the format of the data file, etc. In one embodiment, administrative utilities 2106 may be combined, for example, with billing system administration 500. Data upload utility 2402 may be used to browse, validate, upload, query, etc. invoice data and/or unbilled usage charge data. Delete utility 2404 may be used to delete invoice data and/or unbilled usage data, for example, using an invoice number, invoice date, start date, end date, etc.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A computer-implemented method for reporting data related to conferencing services, comprising:
receiving, at a computer, data related to a conference conducted by participants associated with a customer, wherein the data comprises customer-supplied information related to a client of the customer, and wherein the participants are organized into groups using at least one identifier previously supplied by the customer;
receiving, at the computer, a request for data related to a conference conducted by participants associated with a customer;
receiving, at the computer, a primary search criteria selected from among a set of data fields in the data related to the conference;
receiving, from the customer, a secondary search criteria; and
providing a report containing data related to the conference meeting the primary search criteria and the secondary search criteria, wherein the report includes the customer-supplied information and wherein the report includes the at least one identifier previously supplied by the customer.

2. The method of claim 1, wherein the providing further includes at least one of: displaying the report to the customer, enabling the customer to download the report, or enabling the customer to print the report.

3. The method of claim 1, wherein the customer-supplied information includes at least one of a client name, a payment amount, a check number, a credit amount, or a transaction type.

4. The method of claim 1, wherein the set of primary or secondary filter criteria includes at least one of: invoice date, invoice number, office code, moderator, biller code, client code, or matter code.

5. The method of claim 1, wherein the report includes historical invoice data.

6. A system for reporting data related to conferencing services, comprising:
a data receiving component configured to receive, at a computer, data related to a conference conducted by participants associated with a customer, wherein the data comprises customer-supplied information related to the client, and wherein the participants are organized into groups using at least one identifier previously supplied by the customer;

a request receiving component configured to receive, at a computer, a request for data related to the conference;

a primary search criteria receiving component configured to receive, at a computer, a primary search criteria to identify one of the groups of participants associated with the customer;

a secondary search criteria receiving component configured to receive, at a computer, a secondary search criteria;

a providing component configured to provide a report containing data related to the conference meeting the primary search criteria and the secondary search criteria, wherein the report includes the customer-supplied information.

7. The system of claim 6, wherein the providing component is further configured to enable a user to at least one of: display the report, download the report, or print the report.

8. The system of claim 6, wherein the client supplied information includes at least one of a customer name, a payment amount, a check number, a credit amount, or a transaction type.

9. The system of claim 6, wherein the set of primary or secondary filter criteria includes at least one of: invoice date, invoice number, office code, moderator, biller code, client code, or matter code.

10. The system of claim 6, wherein the report includes historical invoice data demonstrating top users of conferencing services.

\* \* \* \* \*